(12) United States Patent
Orzen

(10) Patent No.: US 12,506,609 B2
(45) Date of Patent: Dec. 23, 2025

(54) SECURELY PROVISIONING A SECURE DATA ASSET TO A TARGET DEVICE USING AN AUTHORIZATION TOKEN

(71) Applicant: Cryptography Research, Inc., San Jose, CA (US)

(72) Inventor: Matthew Evan Orzen, San Francisco, CA (US)

(73) Assignee: Cryptography Research, Inc., San Jose, CA (US)

( * ) Notice: Subject to any disclaimer, the term of this patent is extended or adjusted under 35 U.S.C. 154(b) by 166 days.

(21) Appl. No.: 18/221,247

(22) Filed: Jul. 12, 2023

(65) Prior Publication Data

US 2024/0022410 A1 Jan. 18, 2024

Related U.S. Application Data

(60) Provisional application No. 63/389,785, filed on Jul. 15, 2022.

(51) Int. Cl.
*H04L 9/32* (2006.01)
*H04L 9/08* (2006.01)

(52) U.S. Cl.
CPC .......... *H04L 9/3213* (2013.01); *H04L 9/0877* (2013.01); *H04L 9/3247* (2013.01)

(58) Field of Classification Search
USPC ........................................................ 713/168
See application file for complete search history.

(56) References Cited

U.S. PATENT DOCUMENTS

| | | | |
|---|---|---|---|
| 9,043,606 B2 | 5/2015 | Bister et al. | |
| 9,071,439 B2 | 6/2015 | Nystrom et al. | |
| 9,231,758 B2 | 1/2016 | Bar-El et al. | |
| 9,331,990 B2* | 5/2016 | Le Saint | G06Q 20/38215 |
| 9,692,737 B2 | 6/2017 | Walters et al. | |
| 10,015,164 B2 | 7/2018 | Hamburg et al. | |
| 10,911,234 B2 | 2/2021 | Jain et al. | |
| 2011/0063093 A1* | 3/2011 | Fung | G06Q 10/0875 |
| | | | 340/10.52 |
| 2015/0326567 A1* | 11/2015 | Hamburg | G06F 21/72 |
| | | | 713/155 |
| 2019/0227784 A1* | 7/2019 | De Atley | G06F 8/65 |
| 2020/0322286 A1* | 10/2020 | Mehta | H04L 67/104 |

\* cited by examiner

*Primary Examiner* — Sanchit K Sarker
(74) *Attorney, Agent, or Firm* — Lowenstein Sandler LLP

(57) ABSTRACT

A request, from a tester device, to generate a secure data asset to be securely provisioned to a target device is received by an appliance cluster. The request includes an authorization token. Responsive to receiving the request, one or more verification operations to determine whether the tester device is authorized to request the generation of the secure data asset is performed based on the authorization token. Responsive to determining that the tester device is authorized to request the generation of the secure data asset, a generation of the secure data asset by a hardware security module (HSM) is caused. The generated secure data asset is sent to the tester device in response to the request to generate the secure data asset.

20 Claims, 9 Drawing Sheets

SECURELY PROVISIONING A SECURE DATA ASSET TO A TARGET DEVICE USING AN AUTHORIZATION TOKEN

RELATED APPLICATIONS

This application claims the benefit of Provisional Application No. 63/389,785, filed Jul. 15, 2022, the entire content is hereby incorporated by reference herein.

TECHNICAL FIELD

Aspects and embodiments of the disclosure relate to cryptographic management (CM) systems, and more specifically, to systems and methods for using authorization tokens to securely provision a secure data asset to a target device.

BACKGROUND

The need for secure systems and applications is growing. Presently, allegedly secure ICs are often programmed with security keys (e.g., cryptographic keys) on the factory floor. Secure keys may be used in a variety of ways, such as, for example, to protect stored data, control access to digital content, or encrypt/authenticate data used in transactions. These keys can be stored in a one-time programmable memory, which may hold keys directly or hold a base key that is used with cryptographic functions that derive keys for other various functions. Typically, security is provided by performing the cryptographic key loading process in a secured facility.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

Aspects of the disclosure describe a method comprising: receiving, by an appliance cluster and from a tester device, a request to generate a secure data asset to be securely provisioned to a target device, the request comprising an authorization token; responsive to receiving the request, performing, based on the authorization token, one or more verification operations to determine whether the tester device is authorized to request the generation of the secure data asset; responsive to determining that the tester device is authorized to request the generation of the secure data asset, causing a generation of the secure data asset by a hardware security module (HSM); and sending the generated secure data asset to the tester device in response to the request to generate the secure data asset.

In some embodiments, the method includes wherein the authorization token comprises a job identifier related to a number of secure data assets that are allocated to a job, the method further comprising: identifying, based on the job identifier, the number of secure data assets that are allocated to the job; and determining that the secure data asset corresponding to the request satisfies a condition related to the number of secure data assets that are allocated to the job, wherein determining that the tester device is authorized to request the generation of the secure data asset is responsive to determining that the secure data asset corresponding to the request satisfies the condition.

In some embodiments, the method includes wherein performing the one or more verification operations to determine whether the tester device is authorized to request the generation of the secure data asset, comprises: validating a digital signature associated with the authorization token based on a cryptographic key.

In some embodiments, the method includes wherein performing the one or more verification operations to determine whether the tester device is authorized to request the generation of the secure data asset, comprises: determining one or more tester devices identified by the authorization token; and determining whether the tester device associated with the request to generate the secure date asset is among the one or more tester devices identified by the authorization token.

In some embodiments, the method includes wherein performing the one or more verification operations to determine whether the tester device is authorized to request the generation of the secure data asset, comprises: determining one or more appliance clusters identified by the authorization token; and determining whether the appliance cluster that received the request to generate the secure date asset is among the one or more appliance clusters identified by the authorization token.

In some embodiments, the method includes wherein performing the one or more verification operations to determine whether the tester device is authorized to request the generation of the secure data asset, comprises: determining a time period identified by the authorization token, the time period indicating a period of time during which the generation of the secure data asset is permitted; and determining whether the request is received is within the time period.

In some embodiments, the method includes wherein performing the one or more verification operations to determine whether the tester device is authorized to request the generation of the secure data asset, comprises: determining one or more user identifiers identified by the authorization token; and determining whether a user identifier associated with the tester device is among the one or more user identifiers identified by the authorization token.

In some embodiments, the method includes wherein the authorization token comprises a job identifier related to a number of secure data assets that are allocated to a job, wherein the authorization token is a first authorization token, the method further comprising: determining a subset of the number of secure data assets that are allocated to the job based on the first authorization token; determining whether the generated secure data asset corresponding to the request satisfies a condition related to the subset of the number of secure data assets that are allocated to the job; and responsive to determining that the generated secure data asset satisfies the condition, generating a second authorization token comprising the job identifier; and providing the second authorization token to the tester device.

In some embodiments, the method includes wherein the secure data asset comprises one or more of encrypted data, authenticated data, or a certificate.

A further aspect of the disclosure provides a system comprising: a memory; and a processing device, coupled to the memory, the processing device to perform a method according to any aspect or embodiment described herein. A further aspect of the disclosure provides a non-transitory computer-readable medium comprising instructions that, responsive to execution by a processing device, cause the processing device to perform operations comprising a method according to any aspect or embodiment described herein.

BRIEF DESCRIPTION OF THE DRAWINGS

The present disclosure is illustrated by way of example, and not by way of limitation, in the figures of the accompanying drawings.

DETAILED DESCRIPTION

Figure 1:
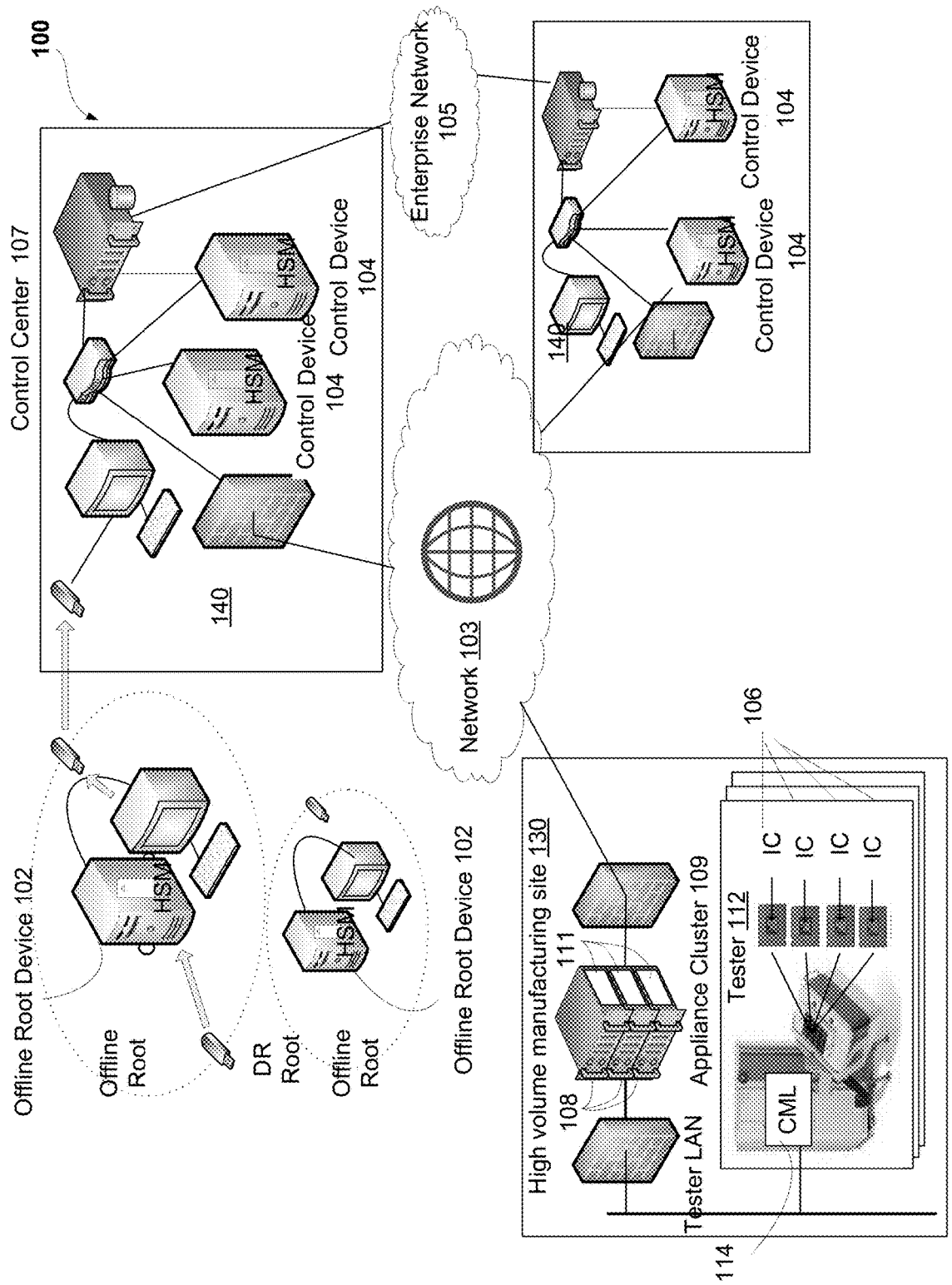
FIG. 1 illustrates a network diagram of a CM system, in accordance with some embodiments of the disclosure.

The embodiments described herein describe technologies of a secure asset management infrastructure for providing secure data assets to target devices in one or more stages of a manufacturing lifecycle of target devices. In some embodiments, the secure asset management infrastructure (also referred to as cryptographic manager (CM) Ecosystem) includes a multi-device cryptographic manager system (hereinafter referred to as "CM system") of hardware and software designed to provide secure chip manufacturing. In other embodiments, the CM system can include one or more devices (e.g., single server, multiple servers, cloud-based service, etc.) The CM system includes various authorizing, customizing, and testing subsystems and other processes aimed at secure device manufacturing. The CM system can securely generate, process, and deliver payload data, such as secure data assets. A CM system can typically include a CM Root device (referred to herein as "Root device" or "CM Root device"), one or more CM Control devices (referred to herein as "Control device" or "CM Control device"), a number of CM Appliance devices (referred to herein as "Appliance devices" or "CM Appliance devices" or "Appliance cluster"), Tester devices, and CM Cores and related software. CM Cores can refer to any memory element (e.g., usually persistent memory to store the secure data asset) that can store data. CM Cores often also include and/or are used in conjunction with one or more processing cores. CM Cores are often integrated circuits and in some case can be specialized integrated circuits, such as specialized CM Cores. In most instances, the CM Cores are integrated into a target device. A CM Appliance(s) in this CM ecosystem can include a device and/or software that, at least in part, securely generates, processes, and delivers payload data (also referred to as "secure data asset" or "data asset") to a CM Core (e.g., integrated circuit) of a target device.

A CM system may be used to provision large numbers of secure data assets to target devices for multiple different entities. For example, company A may use a CM system to provision 500,000 secure data assets to target devices of integrated circuit (IC) manufacturer X and provision another 100,000 secure data assets to target devices of IC manufacturer Y. The provisioning of 500,000 secure data assets to target devices of IC manufacturer X can correspond to a particular job (e.g., job X to generate 500,000 secure data asset for manufacturer Z). Similarly, the provisioning of 100,000 secure data assets to target devices of IC manufacturer Y can correspond to another job (e.g., job Y).

In some cases, secure data assets may be accidently or maliciously provisioned. For example, an operator of a Tester device may accidentally or maliciously provision secure data assets to target devices under the incorrect job. To control the number of secure data assets that are accidentally or maliciously provisioned, data logs related to the provisioning of target devices are generated and maintained. Audits of the data logs can be conducted to determine whether secure data assets have been accidentally or intentionally provisioned. However, such audits can determine whether target devices have been accidentally or maliciously provisioned only after such events have occurred, and do not provide the ability to prevent the occurrences of accidental or malicious provisioning of secure data assets to target devices.

Aspects of the disclosure address at least the above challenges among others by implementing a cryptographic token, such as an authorization token, that can be used to control provisioning activity at production sites (e.g., IC manufacturer X and Y). In some embodiments, an authorization token can be generated at the Control center for each job and distributed to a Tester device. In some embodiments, the authorization token can encode a job identifier corresponding to a particular job in a tamper-proof manner (e.g., cryptographic signature). When requesting generation of a secure data asset (e.g., execution of a Use case) for a particular job, a Tester device can provide the corresponding authorization token to the Appliance cluster. One or more verification operations can be performed by the Appliance cluster based on the authorization token to determine whether the Tester device is authorized to request the generation of the secure data asset (e.g., determine the validity of the authorization token). For example, the Appliance cluster can validate the authorization token by validating the cryptographic signature associated with the authorization token based on a cryptographic key.

In some embodiments, the authorization token can identify one or more parameters that can "bind" the authorization token to one or more particular elements or one or more conditions, such that the authorization token can be validated if (e.g., only if) the parameters are verified. For example, the authorization token can be time bound to a validity period or other time-based criteria (e.g., particular work shift). In another example, the authorization token can be bound to credential(s) that identify one or more Tester devices that authorize specific Tester device(s), among a larger number of Tester devices, to provision secure data assets to target devices. In another example, the authorization token can be bound to one or more Appliance clusters that authorize specific Appliance cluster(s), among a larger number of Appliance clusters, to generate secure data assets. In still another example, the authorization token can be bound to one or more specific operators of one or more Tester devices such that only the specific operators are permitted to make valid requests to generate secure data assets.

In some embodiments, to determine whether the Tester device is authorized to request the generation of the secure data asset, the Appliance cluster can further verify, based on the authorization token, whether the requested secure data asset(s) are within the number of secure data assets allocated to the particular job.

In some embodiments, the authorization token can be implemented such that the same authorization token can be used for the entire job. In some embodiments, an authorization token may authorize a generation of a subset of secure data asset of a job. Once the subset of the secure data assets have been generated, the Appliance cluster may generate a new authorization token for a new subset of secure data assets for the same job.

As noted, a technical problem addressed by embodiments of the disclosure is an inability of some CM systems to offer a technical system that prevents the occurrence of accidental or malicious provisioning of secure data assets to target devices.

A technical solution to the above-identified technical problem may include implementing authorization tokens that can be used to control provisioning activities at production sites.

Thus, the technical effect may include a more secure CM system that has the technical flexibility to prevent the occurrence of accidental or malicious provisioning of secure data assets to target devices.

An authentication token can refer to an electronic credential issued by a trusted party that verifies (e.g., authenticates) the holder or owner of the authentication token and/or verifies that the holder or owner of the authentication token owns the corresponding public cryptographic key. In some embodiments, the authentication token can include a job identifier that identifies a particular job. As noted above and in some implementations, the authorization token can identify one or more parameters that can "bind" the authorization token to one or more particular elements or one or more conditions, such that the authorization token can be validated if (e.g., only if) the parameters are verified. The one or more parameters are further described below at least with respect to FIG. 3A-3C.

In some embodiments, the authorization token can have at least some features of a digital certificate. In some embodiments, the authentication token can include a public cryptographic key. In some embodiments, the authentication token can include a cryptographic signature (e.g., digital signature) based on contents of the authorization token signed using a cryptographic key, such as a private cryptographic key. For example, to generate the digital signature, one or more of the contents of the authorization token (e.g., job identifier and/or parameters) can be used as input to a hash function to generate a hash value (e.g., hash text). The hash value may be encrypted using a private key to generate the digital signature.

A job can refer to an assignment of work (e.g., computational work) to provision one or more secure data assets where the provisioning of the secure data assets is associated with a particular entity, such as a legal entity, manufacturing entity, etc. A job may be associated with the provisioning of a particular number of secure data assets (e.g., allocation). A job can be associated with a job identifier that identifies the particular job. For example, a particular job may be associated with a particular legal entity and be associated with the generation of 1,000 secure data assets.

Cryptographic manager provisioning (also generally referred to as "provisioning" herein) can refer to one or more of the operations of a CM system in providing a secure data asset to a target device. The one or more of the operations described with respect to CM system, such as CM system 100 (e.g., Root device 102, Control center 107, Appliance cluster 109, Tester device 112, and/or Target device 106) can be part of the provisioning of a secure data asset to a target device.

A data asset (also referred to a "secure data asset" or "secure asset" herein) can refer to sensitive data that is generated, at least in part, by a Module. A data asset can include one or more of encrypted data (e.g., cryptographic keys), authenticated data (e.g., confirmation of the origin and/or integrity of the data), or a certificate (e.g., a data block authenticated using an authenticating digital signature). In some embodiments, the data asset can include a Sequence, as described below. In still some embodiments, the data asset can include specialized software code.

A hardware security module (HSM) can refer to a tamper-resistant physical computing system used to safeguard the processing and storage of sensitive data. The HSM can include hardware (e.g., one or more cryptographic processing devices), software or a combination thereof that operate together to safeguard the sensitive data. For example, the HSM can safeguard and manage digital keys, perform encryption and decryption functions for digital signatures, perform strong authentication or other cryptographic functions. In some embodiments, an HSM can be a plug-in card or an external device that attaches directly to a computer or network server. If the HSM were to be maliciously opened, the keys and potentially some hardware of the HSM would be destroyed and unrecoverable.

A Module can refer to data and/or software code, often custom firmware that can run inside an HSM and that can perform security sensitive computations. The execution of the Module can result in a Module response that can include one or more secure data assets. A single Appliance cluster may run many Modules and each Module may be designed to provide a single type of transaction (e.g., singed certificate) to a target device. A particular Module can be used with one or more Contexts.

A Context (also referred to "Context data" herein) can refer to secure data that is often encrypted and may be used to generate a secure data asset. In some embodiments, a context can include one or more cryptographic private keys and/or additional data. In embodiments, a particular Context typically can be used with a single Module. For example, a Module can decrypt an encrypted Context and use the private key to sign a digital certificate. In some embodiments, different Contexts can be used by the same Module. By implementing a Context, a Module can be re-used for different Contexts (e.g., different private keys) without having to re-write the Module for the different private keys, for example. In some embodiments, a Context can be the same for every execution of a Use case (UC). In some embodiments, the Context is only data (e.g., no software code).

An Application can refer to software that runs on a high-level operating system (OS), such a Linux or other OS. The Application can be integrated in the processing, generation and delivery of secure assets to target devices. In some embodiments, the Application can interface between the Tester device and HSM in the provisioning of secure assets to target device. The Application can perform one or more custom functions and/or procedures, and/or make calls over the network (e.g., unsecured public network) to retrieve data and/or request services. In some embodiments, the Application can perform less secure operations of the provisioning process than the HSM. In some embodiments, resource intensive operations (e.g. computational resource intensive operations such as parsing in Abstract Syntax Notation One (ASN.1)) can be offloaded (from the HSM) to the Application to take advantage of the additional computer resources provided by the server system implementing the Application.

A Library component (also referred to as "Library" or "Library module" herein) can include pre-written code that includes one or more of functions, procedures, or corresponding values. The Library component can also execute the pre-written code. In some embodiments, the Library component can be stored and/or executed at an HSM. In some embodiments, the Library component can be middleware that provides an interface between the Application running on an operating system (OS) and the Module. In some embodiments, the Library component provides functions and/or procedures that can be used with and help assist with the execution of tasks related to Modules. In some embodiments, the Library component can work with multiple different Modules. In some embodiments, the Library component is configured to execute standard functions and procedures on behalf of the Modules.

Use case (UC) can refer to the multiple elements such as a Context, a Module, and Application that can be used together in the generation, processing, and/or delivery of secured data assets to target devices. In some embodiments, the UC can include a Library component or information related to the Library component (e.g., version number). In some embodiments, the Context, Module and Application are bound together such that only the particular Context, particular Module, and particular Application work together in the provisioning of the secured assets to target devices. In some embodiments, the Context, Module and Application are cryptographically bound such that a cryptographic key is created and applied in manner that the particular Context, particular Module and particular Application will only work together after satisfying various cryptographic checks.

FIG. 1 illustrates a network diagram of a CM system 100, in accordance with some embodiments of the disclosure. The CM system 100 typically includes a variety of cryptographic manager (CM) devices. In some embodiments, the CM system 100 may provide secure transaction processing and data reporting infrastructure designed to provide secure key and asset management capabilities to a target device 106 (e.g., mobile devices) through a web service interface. The user or customer for the CM system 100 may include fabless semiconductor vendors, for example, that produce chipsets for mobile devices, system integrators (OEMs) that manufacture internet connected devices, or mobile network operators (MNOs) that deploy these devices on their wireless networks, etc. Such customers may contract out some of the fabrication of their devices or components to third-party manufacturers that operating remote manufacturing facilities, such as a high-volume manufacturing site 130. As a mission critical part of the customer's manufacturing and communications systems, design priorities for the CM system 100 are high availability and integrity.

The manufacturing and assembly of electronic devices and other devices containing electronic components, such as microcontrollers, sensors, processors, etc., have increased along with the increased usage of hardware devices. In effort to reduce the costs of manufacturing, many companies have outsourced aspects of the manufacturing process to third-party companies. Some of these third-party companies may be overseas and may be in jurisdictions in which corporate security is not as robust as in other jurisdictions.

In the manufacturing of certain devices, software, codes, keys and other important sensitive assets (e.g., data assets) may be embedded in or installed on the hardware devices. Currently, these data assets may be transported from the customer to a manufacturing site on a storage medium, such as stored on an optical disc. The management of these data assets may be important to the security and revenues of the customer as it not entirely satisfactory in all respects. The embodiments described herein provide secure-asset management systems and technologies to securely provision data assets to these hardware devices in untrusted environments. The secure-asset management system includes many components that cooperate to allow a customer to monitor and control the receipt and consumption of such data assets during the manufacturing process performed by the third-party manufacturer. The system includes remote components installed at the third-party manufacturer and components used by the customer to communicate with and control these remote components. A data asset, such as a key or key set, a certificate, a unique device identifier, bitcode, a script, etc., can be securely transferred to the target device before the target device is ready for sale to a consumer (e.g. fully operational).

The CM system 100 includes a Root device 102 that can be an entity which authorizes installation, configuration and operation of the CM System 100. The Root device 102 may protect master keys and authorize the setup, installation, configuration and operation of components of the CM system 100 for any given site, such as manufacturing site 130. In some embodiments, the Root device 102 may be considered an offline Root that authorizes setup and major configuration parameters in the operation of the CM System. In some embodiments, data is transferred to and from the Root device 102 by a removable storage device, such as a Universal Serial Bus (USB) Flash drive or the like. Computer systems are subject to trade-offs between security and convenience. Given that the main task of the Root Authority, at least in some embodiments, is to protect master keys that underpin security of an entire CM deployment, the Root Authority design is driven by the need for security. This is why the Root Authority may be, at least in some embodiments, air-gapped (i.e., not connected to any computer network). Additionally, a hardware security module (HSM) may be used to protect most important keys stored by the Root Authority. Because the Root Authority is off-line, it is not assumed to be continuously available. As a result, the Root Authority may authorize a range of permitted actions in advance so that it is not necessary to involve the Root Authority when an action needs to be taken. The Root Authority's authorizations are provided to the Control device, where decisions are made about which authorizations will actually be used.

A Control center 107 (hereinafter "Control" or "Control center"), including one or more Control devices 104, provides a way to centrally control and monitor operation of the CM system 100, as well as provision data to an Appliance cluster 109 (a collection of one or more Appliance devices 108), in accordance with some embodiments of the disclosure. In some embodiments, the Control device 104 can include a hardware appliance used to facilitate central management of the CM System 100 and to provision data to an Appliance cluster 109.

Additionally, a Control device 104 can distribute (via Appliance devices 108) on or more of Modules, Context data, Applications, Library component, version data of the Library component, other data or security parameters destined for target devices 106. In some embodiments, a target device 106 includes at least one memory device to store data assets. In some embodiments, target device 106 includes a monolithic integrated circuit. In some embodiments, the Control devices 104 of the Control center 107 may reside in the customer's physically secure corporate data center 140 and may provide a turn-key security service to the customer to manage its data assets in a remote manufacturing site 130. In another embodiment, the Control center 107 may include multiple Control devices 104 at multiple data centers 140 connected over an enterprise network 105, as illustrated in FIG. 1.

In some embodiments, a data asset can include a digital data file, such as an High-bandwidth Digital Content Protection (HDCP) Device Key Set, which is to be securely transferred to a target device 106 (e.g. CM Core). A data asset can include any sensitive data such as key or key set, a certificate, a unique device identifier (e.g., serial number), bitcode, a script, and firmware that are managed securely through the CM system and provisioned to target devices at various lifecycle stages from manufacturing supply chain to the end user. Data assets can be and are usually device-specific. For example, perso1, perso2, and device serialization records are data assets. An organization may create and sell HDCP keys. For example, a customer buys their keys from the organization, and then imports HDCP keys into the CM Service. The import process reformats the key file as a pre-computed (PCD) file and encrypts it so that only suitably authorized Appliance devices 108 can access the PCD file. The Appliance cluster 109, in some embodiments, is responsible for locally hosting sensitive data assets to be transferred to the target devices 106 during the process of manufacturing the target devices 106 at the manufacturing site 130.

The capability to manage the distribution network of Appliance clusters 109 and to provision data assets (e.g., PCD assets), ticket authorizations, Applications, Contexts Modules, Library components, and library version identifiers across a network 103 of security Appliance devices 108 may be provided by a web service interface to users of the CM system 100. The Appliance cluster 109 may be responsible for securely storing sensitive data (e.g., data assets) locally in the manufacturing facility site 130 and for making that data assets highly available in a low latency manner to a target device 106, such as a system-on-a-chip (SoC) or a subcomponent on such an SoC, during the process of semiconductor device test and/or manufacturing. The target device 106 may be integrated into the SoC design during the design phase of the SoC to provide cryptographic control of SoC feature activation, configuration management, and secure key management.

In some embodiments, the target devices 106 each include one or more CM Cores. In some embodiments, a specialized CM Core can include a specialized integrated circuit, which can be implemented in some embodiments described herein. It should be noted that aspects of the disclosure can be applied to CM Cores (e.g., integrated circuits) generally, as well as to specialized CM Cores. In some embodiments, the specialized CM Core can include a hardware core capable of executing a set of commands (e.g., Sequence), which can be the building blocks for delivering functionality to a product (target device 106). The specialized CM Core can be a hardware core that is configured to execute a set of commands to provide cryptographic control of the secure data asset when the target device is deployed in a Product. For example, the set of command can include one or more of a command feature that includes command activation of one or more features of the target device 106 or a command for secure key management of the target device. A Sequence can refer to software (e.g., script) and/or data (typically both) that assists in the provisioning of a data asset to a target device. In some embodiments, the Module can securely generate a unique Sequence based on information, such as one or more a Context, PCD, arguments or other information. The Sequences can provide secure and authenticated programming instructions to the target device. A Sequence can include a sequence of operations to be performed as a transaction of a specific transaction type with respect to a target device (e.g., specialized CM Core).

An Appliance device 108 can include one or more servers designed to provide secure computation, digital signing and distribution of data assets to target devices 106. In some embodiments, Appliance devices 108 each contain a hardware security module (HSM) 111, which serves both as a vault safeguarding sensitive data and as a platform for execution of a Module. Additionally, Appliance device 108 generates, collects, protects, digitally signs and sends a variety of logging information to the customer via the Control center 107. In some embodiments, an Appliance devices 108 can execute an Application the runs on a high level OS. In some embodiments, the Application can be executed outside the HSM 111.

A Delegate (also referred to as a "Delegate Root" herein) is an entity (such as a specialized device) to which Root device 102 grants a subset of programming capabilities, allowing incorporation of data unknown to the Root device 102 into data assets destined for target devices 106. In some embodiments, the Delegate can operate in conjunction of Root device 102.

The Appliance cluster 109 is a group of Appliance devices 108 providing increased availability of the services offered by an Appliance device 108. If a particular Appliance device 108 is unable to fulfill a request, a Tester device 112 can connect to any other Appliance device 108 in the same Appliance cluster 109 to continue service without major interruption.

In some embodiments, Tester device 112 is a machine used in semiconductor device fabrication to test whether devices perform properly. The CM System uses Tester devices 112 to program data, such as data assets, during wafer sort and package test, in some embodiments. In some embodiments, a Tester device 112 is generally an untrusted device, located at the manufacturer's site 130, used to deliver data assets to the specific target devices 106. In some embodiments, the Tester device 112 is a device designed to perform validation, characterization, and high-volume manufacturing tests. Tester device 112 can run a series of semiconductor tests, one or several of which will be a part of the CM System operation. The Tester device 112 is relied on to initiate the communications with the Appliance cluster 109 and to provide logging information.

In some embodiments, the Tester device 112 can access a client library 114. The client library 114 may be a software component to be integrated with a primary application of the Tester device 112. The client library 114 may be the CM client library. The Tester device 112 can use the CM client library to access functions and/or procedures used with the Application in provisioning a secure data asset to a target device 106.

To make the data available to the target device 106, the Appliance cluster 109 may be connected to the asset management service, called Control center 107, over a network 103, such as the public internet, a private network, and/or combinations thereof. The Appliance cluster 109 may reside in a data center of the outsourced manufacturing facility site 130 and may act as a proxy to the Control center 107. The Appliance clusters 109 make available a secure and highly available local inventory of data (e.g., PCD assets) and ticket authorizations during manufacture to target devices 106 using strong authentication and access control in a low latency manner.

In some embodiments, the provisions and/or installation of a data asset to a target device 106 may be referred to as an asset-management transaction. A single Appliance cluster 109 may run many Modules and each Module may be designed to provide a single type of transaction to a target device. In some embodiments, the security sensitive computations used or performed by the Module may be performed on a HSM 111. Other operations (typically less security sensitive operation) related to the asset-management transaction can be performed by the Application. In some embodiments, the Application executes on the same or different Appliance cluster 109, but outside the HSM 111. In some embodiments, the Application executes outside the Appliance cluster 109. In some embodiments, sensitive computations and less security-sensitive operations can be performed by the Appliance cluster 109. A Module, along with the tamper-proof HSM 111 on which the Module executes, may consume a target device specific authorization, or ticket, from a bulk authorization file provisioned by the Control center 107 to the Appliance device 108 or Appliance cluster 109.

In some embodiments, a PCD Template is a description of how the PCD, which, in some embodiments, becomes input for a particular type of Module, is formatted. In some embodiments, the Application can also use the PCD to, or example, generate another PCD or perform one or more cryptographic checks. A PCD type is a set of PCDs based on a particular PCD Template, having a particular property, such as uniqueness, serialization, etc. For example, a PCD can include CM root-generated keys, serial numbers etc. that are securely packaged such that only the CM Core (e.g., specialized CM Core) on a target device 106 can provision the data. In another example, the PCD includes keys from various vendors (for example, HDCP keys) securely managed from the CM Control to the target device. Key data are transformed into PCD on loading into the Control.

It should be noted that various portions of the description refer to components of the CM system 100, such as Root, Control or Appliance as logical entities. Sometimes the internal structure of a logical entity is important. In some embodiments, a Control entity can include one or more servers, a shared file system, a shared database, or the like. In the contexts where internals of Control center 107 are important and each of these servers is viewed as a logical entity, each of them is referred to as Control device, to distinguish it from the Control entity (which represents Control devices as well as shared resources). In some embodiments, a Root device 102 can include a server implementing the functionality of the Root Authority. In some embodiments an Appliance device can include one or more servers (typically a member of the Appliance cluster 109 of Appliance devices 108). In some embodiments, a Target Device 106, typically a CM core (e.g., integrated circuit) of the target device, is the consumer of the functionality of the CM System 100. In some embodiments, the Root Devices 102, Control devices 104 and Appliance devices 108 each include a main computing device (e.g., one or more processing devices or the like) as well as an embedded HSM 111. Some of the identifiers (IDs) and cryptographic keys will be stored inside the HSM 111, while others will be stored on the device's hard drive. Exact location of the IDs or keys can be determined based on their sensitivity and the implementation details as described herein. In some embodiments, IDs are used to identify components within the CM System 100. Some of the components are entities (e.g. Control center 107), while others are devices (e.g. Control device 104).

For a CM system in some embodiments, multiple platforms in the provisioning of a secure data asset to a target device. In some embodiments, the CM system can implement a Use case, which can include multiple elements such as a Context, a Module, and Application that can be used together in the generation, processing, and/or deliver of secure data assets to target devices. In some embodiments, the Context, Module and Application are cryptographically bound (e.g., immutable) such that a particular Context, a particular Module and a particular Application can only be used together after satisfying some cryptographic checks. In some embodiments, the separation of the Context (e.g., sensitive data, such as private cryptographic keys) and the Module (e.g., logic) can facilitate more technical flexibility of the CM system. For example, an untrusted party can develop the Modules while the sensitive data (e.g., Context) can be secured and/or handled by a trusted party. In another example, Modules can be re-used with different Contexts, rather than be re-written for every Context.

In some embodiments, the operation of executing a Use case (e.g., processing and generating a secure data asset) can be spread across multiple platforms. In some embodiments, a Tester device can request an Application, running on a high-level operating system (OS) and operating on a first platform, to execute a Use case. In some cases, the Application may perform less secure operations and/or make request via a public or private network for data and/or the performance of some services related to the provisioning of the secure asset to the target device. In some instances, the Application can be executed on a platform having robust computer resources, which can be leveraged towards operations related to the provisioning of the secure data asset.

In some embodiments, after performing the one or more operations related to the execution of the Use case, the Application can send a request to execute the Use case to another platform, such as a hardware security module (HSM). The request may or may not include some information identified or generated from the operation(s) performed by the Application. In some embodiments, the HSM can include a Library component and a Module. In other embodiments, the Library component and Module can be executed at different platforms, such as at different HSMs. The Library component can receive the request from the Application and perform one or more standard routines or procedures related to the request. For example, the Library component can decrypt the Context. In some embodiments, the Library component can be an interface between the Application and Module that provides consistent and standardized communication between the two components.

In some embodiments, the Library component can send a request to the Module to execute the Use case, and in some instances may or may not include some information identified or generated from the operation(s) performed by the Library component. The Module can perform secure generation of the secure asset based on the request from the Library component. For example, the Module can sign a digital certificate using at least the Context data. The Module can send a Module response, which includes the secure data asset, back to the Library component. The Library component can send the Module response to the Application, and the Application can send the Module response (or some modified version) back to the Tester device, which can use the Module response to provision the secure data asset to a target device.

Figure 2A:
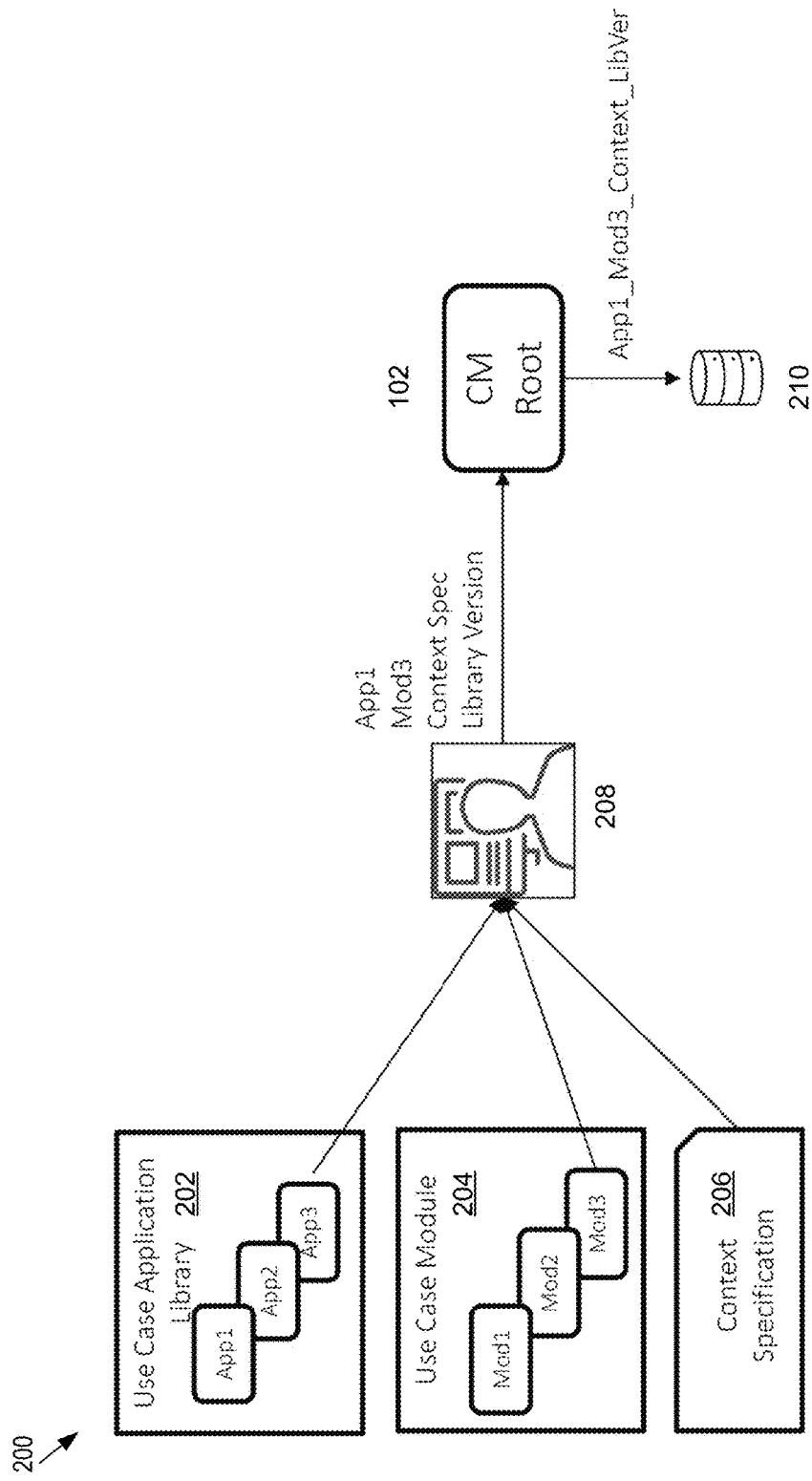
FIG. 2A is a diagram illustrating Use case (UC) creation at a CM system, in accordance with some embodiments of the disclosure.

FIG. 2A is a diagram illustrating Use case (UC) creation at a CM system, in accordance with some embodiments of the disclosure. Diagram 200 illustrates Use case application library 202, Use case Modules 204, Context specification 206, user terminal 208, CM Root 102, and data store 210.

In some embodiments, data store 210 is a persistent storage that is capable of storing data as well as data structures to tag, organize, and index the data. Data store 210 may be hosted by one or more storage devices, such as main memory, magnetic or optical storage based disks, tapes or hard drives, NAS, SAN, and so forth. In some embodiments, data store 210 may be a network-attached file server, while in other embodiments, data store 210 may be some other type of persistent storage such as an object-oriented database, a relational database, and so forth, that may be hosted by CM system 100 or one or more different machines coupled to the CM system via the network 103.

Use case application library 202 illustrates N number of Applications (e.g., App 1 through App 3). Use case Modules 204 illustrates N number of Modules (e.g., Mod 1 through Mod 3). In some embodiments, particular Applications of the Use case Application library 202 and particular Modules of the Use case Modules 204 are interoperable, while other Applications of the Use case Application library 202 and Modules of the Use case Modules 204 are not interoperable. For example, Module 1 of the Use case Modules 204 can perform certificate generation (e.g., hashing and singing data, without necessarily knowing what the data is). Module 1 can be interoperable with Application 1 and Application 2, but not interoperable with Application 3. Application 1 can be used with signing an X.509 certificate (e.g., X.509 can refer to an International Telecommunication Union standard defining the format of public key certificates) and Application 2 can be used with signing a custom certificate (e.g., compressed certificate with a custom format that is not based on any standard).

Context specification 206 can refer to a layout, definition or template of the Context that can be used with particular Use cases. The Context specification 206 can identify or define the particular Context(s) that can be used for a Use case. For example, for the Use case that includes Application 1 and Module 1, the Context specification 206 can identify three keys (e.g., a first 256 bit key, a second 256 bit key, and a 128 bit key) that can be used with Application 1 and Module 1.

In an illustrative example, Use case 1 may be related to signing an X.509 certificate and may include Application 1 and Module 1. The Context specification 206 can identify a one or more 256-bit keys for use with the X.509 certificate generation Use case 1. In another example, Use case 2 may be related to signing the custom certificate and may include Application 2 and Module 1. The Context specification 206 can identify a 128-bit key for use with the custom certificate generation Use case 2.

As illustrate in diagram 200, user terminal 208 (e.g., command line interface (CLI) of a display device coupled to the CM root 102) can use one or more Applications from the Use case Application library 202 (typically one Application), one or more Modules from the Use case Modules 204 (typically one Module) and the Context specification 206 as input to generate a Use case. For example, Application 1, Module 1 and the Context specification can be identified at the CLI and submitted to the CM root to generate Use case 1. The CM Root can associate the elements of the particular Use case and store those elements at data store 210. In some embodiments, the elements of the Use case can be cryptographically bound and stored at data store 210.

In some embodiments, the input data can include an identifier of the library version of the Library component that is to be used with the Use case. For example, the identifier of the Library version can identify the current version of the Library module associated with one or more of the Application (e.g., Application 1) or the Module (e.g., Module 1). In some embodiments wherein the library version is used as input to create a Use case, the Use case can include a Module, an Application, a Context, and at least an identifier of a version of the Library component. In some embodiments, rather than cryptographically bind the library version with the other elements of the Use case, the identifier of the library version can be stored as metadata that is associated with the Use case.

In some embodiments, the CM root 102 stores the Use case at data store 210. In some embodiments, the stored Use case can later be distributed, such as to one or more Appliances.

It can be noted that in some embodiments, the same Application and the same Module can be used together with different Contexts to form different Use cases. For example, Application 1 and Module 1 can be used in conjunction with Context 1 for a Use case 1. In this example, Application 1 and Module 1 can be used for X.509 certificate generation and Context 1 specifies a first 256-bit key. Application 1 and Module 1 can be re-used in conjunction with Context 3 for Use case 3. In this example, Application 1 and Module 1 can still be used for X.509 certificate generation, but Context 3 specifies a different 256-bit key. In some embodiments, Context allows for the re-use of one or more of the Application or Module.

Figure 2B:
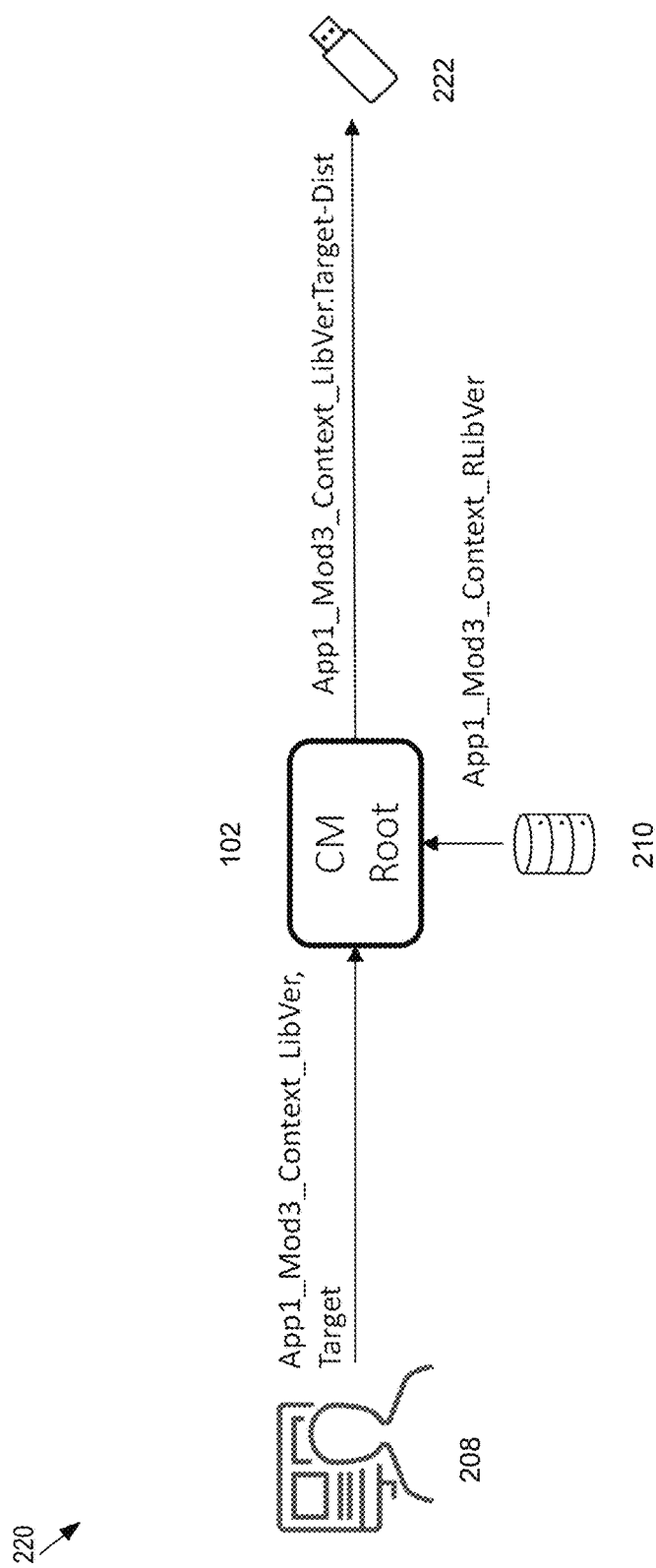
FIG. 2B is a diagram illustrating Use case (UC) distribution at a CM system, in accordance with some embodiments of the disclosure.

FIG. 2B is a diagram illustrating Use case (UC) distribution at a CM system, in accordance with some embodiments of the disclosure. Diagram 200 illustrates the distribution of the Use case, for example, the distribution of a Use case to an Appliance device 108 of the Applicant cluster 109. For example, a user can request the distribution of a Use case, via user terminal 208, to device 222, such as an offline storage device (e.g., USB). The distribution request can identify the Use case by name (e.g., Use case 1) or one or more of the elements of a particular Use case (e.g., Module 1, Application 1 and Context 1). The CM root 102 can retrieve the requested Use case from data store 210 and sent the Use case to device 222.

In some embodiments, at the CM root 102 encrypts the Use case using a key (e.g., key1). Responsive to a distribution request, the key (e.g., key 1) is encrypted with another key (e.g., key 2) that was previously shared with the Appliance to which the Use case is to be distributed. The encrypted Use case and the encrypted key (e.g., key 1) can be saved to device 222 and distributed to Appliance cluster 109 of FIG. 1. The Appliance cluster 109 possesses key 2, which allows the Appliance cluster 109 to decrypt the encrypted key (e.g., key 1) that can be used to decrypt the encrypted Use case.

In some embodiments, the Use case can be cryptographically bound responsive to the distribution request. In other embodiments, the Use case can be cryptographically bound responsive to the request to create the Use case illustrated with respect to FIG. 2A above.

Figure 2C:
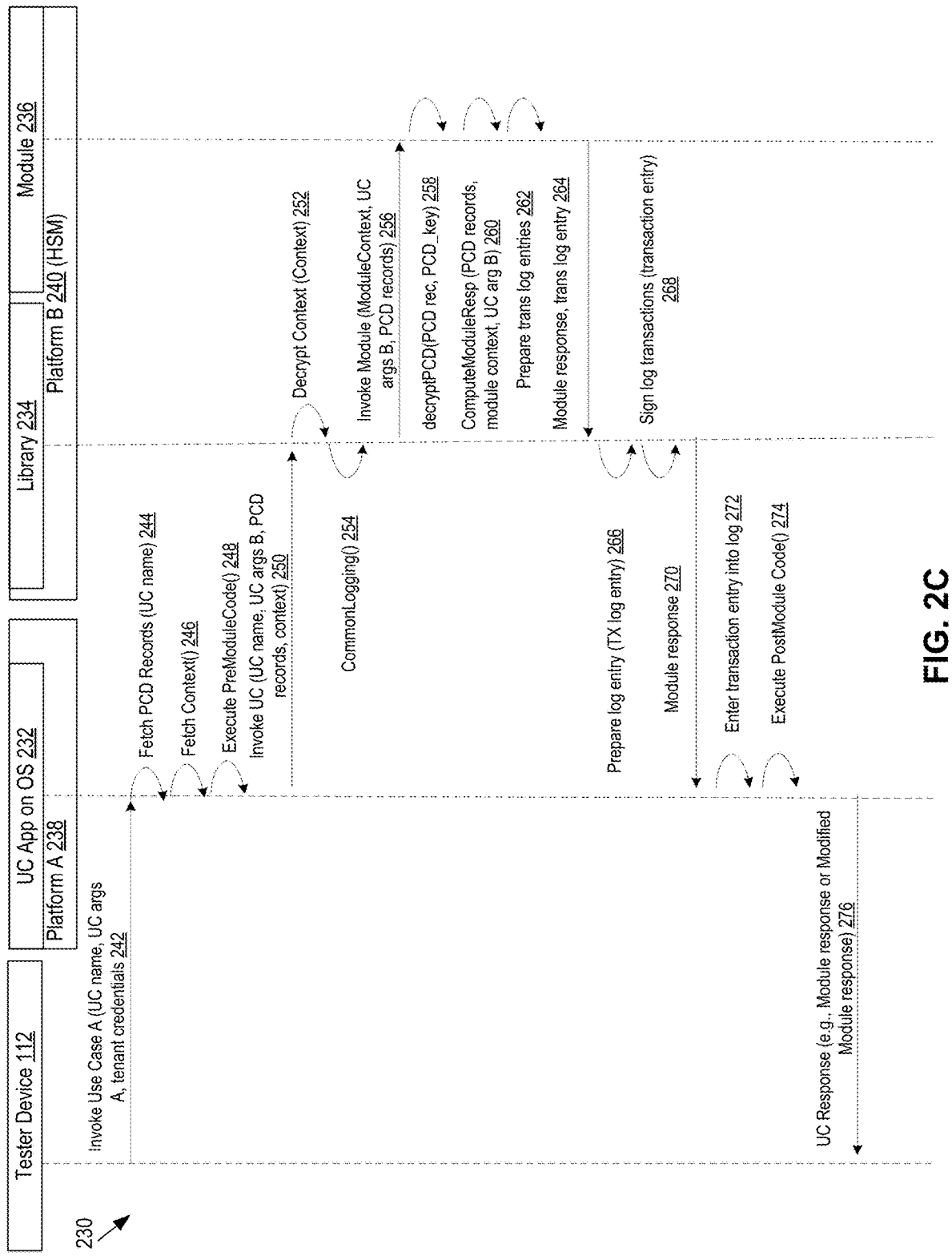
FIG. 2C is a sequence diagram illustrating execution of a Use case (UC) at a CM system, in accordance with some embodiments of the disclosure.

FIG. 2C is a sequence diagram illustrating execution of a Use case (UC) at a CM system, in accordance with some embodiments of the disclosure. Diagram 230 may include similar elements as illustrated in CM system 100 as described with respect to FIG. 1. It may be noted that elements of FIG. 1 may be used herein to help describe FIG. 2C. The operations described with respect to FIG. 2C are shown to be performed serially for the sake of illustration, rather than limitation. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed.

Diagram 230 illustrates Tester device 112, Application 232 (also referred to as "Use case Application" herein), Library 234 (also referred to as "Library component" herein), and Module 236 (also referred to as "CM Module" herein). In some embodiments, Application 232 runs on a high-level OS, such as Linux or some other OS. In some embodiments, the OS and the Application can be operating on Platform A 238. In some embodiments, Library component 234 and Module 236 can be operating on Platform B 240. It can be noted that in some embodiments Library component 234 and Module 236 can be executed at different platforms (e.g., separate HSMs 111). In some embodiments, Platform A can be an Appliance 108 of and Appliance cluster 109 and Platform B 240 can be an HSM of the same or different Appliance 108 or Appliance cluster 109. In embodiments where both Platform A 238 and Platform B 240 are operating on an Appliance (same or different), Application 232 can be executing on a first processing device (typically unsecured or untrusted processing device) and one or more of Library component 234 or Module 236 can be executing on a second processing device (typically a secured and trusted processing device, such as a processing device of the HSM 111). In other embodiments, Platform A 238 and Platform B 240 can be entirely separate systems. For example, Library component 234 and Module 236 can be executing at an HSM 111 of an Appliance 108 and Application 232 can be executing on a remote device outside Appliance cluster 109. In some embodiments, Platform A 238 can be directly be connected to a network, such as a public or private network, and be able to make calls to other devices outside the Appliance cluster 109. In some embodiments, Platform B 240 is not directly connected to a network and/or cannot makes calls to devices outside the Appliance cluster 109. It can be noted that in some embodiments, a Use case can be executed across multiple platforms, such as Platform A 238 and Platform B 240.

At operation 242, Tester device 112 sends a request to Application 232 to generate a secure data asset. In some embodiments, this request can be referred to as a request to invoke a Use case. In some embodiments, the request from Tester device 112 at operation 242 can identify and/or include one or more of an identifier of the Use case (e.g., Use case name), Application name, Context name, Module name, PCD name, Use case arguments A, credentials (e.g., Transport Layer Security (TLS) certificates) or an identifier of the version of the Library component 234 to be used with the requested Use case.

In some embodiments, an argument (e.g., Use case argument) can be data that is used as input, at least in part, to a Module to generate a secure data asset. In some embodiments, the arguments can include a variable list of arguments. In some embodiments, the arguments are specific to the Use case. The arguments can include any type of data, such as device information, data related to a true random number generator, time of day, etc. In some embodiments, the arguments can include specific feature bits for a Module such that the Module can implement specific features based on the feature bits. In some embodiments, the arguments can include memory offsets that determine where the resulting keys are stored at Platform A 238 (e.g., keys used to generate secure data asset).

In some embodiments, Tester device 112 uses a library, such as CM library (e.g., client library 114) to facilitate the request (e.g., call) to Application 232. In some embodiments, the request from Tester device 112 can use a protocol such as HTTP, (e.g., an HTTP type request).

At operation 244, Application 232 performs an operation to identify one or more PCD records (e.g., PCDs). In some embodiments, Application 232 retrieves one or more PCDs using the Use case name or Application name, or other identifiers in the request (e.g., operation 242). In some embodiments, the retrieved PCDs can be used by Module 236 in the generation of a secure data asset. In other embodiments, Application 232 may generate PCDs.

Pre-computed data (PCD) can refer to data, generally encrypted data. In some embodiments, the PCD may be used by a Module as input to generate a secure asset. In some embodiments, a PCD can be used by the Application. For example, a PCD can be used as input by the Application to generate another PCD. A PCD can be consumable such that each time a PCD is used (e.g., in the execution of a Use case) the old PCD retired and a new PCD is allocated. For example, a PCD can identify a unique device ID. Once the unique device ID is provisioned to a target device, the first PCD is retired from subsequent use. To provision a new target device, a second PCD is used that can identify a second unique device ID, and so forth. In some embodiments, a PCD can be designed as data that varies between different executions of a Use case.

At operation 246, Application 232 identifies a Context that is to be used with the particular Use case. In some embodiments, Application 232 retrieves the Context based on the Use case name. In some embodiments, the Context is encrypted Context data.

At operation 248, Application 232 executes one or more pre-Module operations. In some embodiments, the one or more pre-Module operations are executed prior to the Module generating the secure data asset of the Use case, and typically before the Module is called to generate the secure data asset. In some embodiments, the pre-Module operations can include some custom code that is specific to the particular Application 232. The pre-Module operations can use the additional computer resources that are available to the Application 232 (and in contrast to the Library component 234 and/or Module 236, in some case). The additional resources can include one or more of network connectivity, computational resources, storage resources, and network bandwidth, for example.

In some embodiments, a pre-Module operation can include the retrieval or generation of additional information related to the request to generate a secure data asset (e.g., from the Tester device 112 or even the request to the Library component 234 or Module 236). In some, embodiments, a pre-Module operation can include a call on the network (e.g., public or private) to retrieve some information or request a service, for example, a pre-Module operation can include a generation of a certificate, a call (e.g., HTTP) to the cloud service provide, a call to any service provide, a generation of the a message to an administrator, etc. It can be noted that the pre-Module operation can be implemented to provide flexibility in the provisioning of secure data assets to target devices, such that the data/computation/operation pipeline between Tester device 112 and Module 236 can be customized for each Use case and/or Application 232 and to take advantage of the computer resource available to the Application 232 in a secure manner.

At operation 250, Application 232 sends to Platform B 240 (e.g., Library component 234) a request to generate a secure data asset in response to the request from Tester device 112 (e.g., operation 242). In some embodiments, the request is to invoke the particular Use case. In some embodiments, the request identifies and/or includes one or more of an identifier of the Use case name, Module name, Application name, arguments B, PCD records identifying one or more PCDs, Context data (e.g., encrypted Context data) or an identifier of the version of the Library component 234 to be used with the requested Use case.

In some embodiments, the arguments B can be identical to arguments A. For example, Application 232 can pass the arguments A received from Tester device 112 to Module 236. In some embodiments, arguments B can be different than arguments A received from Tester device 112. For example, Application 232 can modify some or all of the arguments A and send the modified arguments, e.g., arguments B, to Module 236. In another example, Application 232 can generate new arguments B based at least in part on arguments A. In some embodiments, arguments B are at least related to arguments A received from Tester device 112.

In some embodiments, the Context data is encrypted Context data (e.g., received as encrypted Context data). In some embodiments, the request to Module 236 from Application 232 can be a remote procedure call (RPC). In some embodiments, the request to Module 236 from application excludes a request using an HTTP type request.

At operation 252, in response to the request from Application 232 to generate the secure data asset, Library component 234 can decrypt the Context using a cryptographic key. As noted herein, the library can, at least on some embodiments, be an interface between the Application 232 and Module 236 to perform one or more standard functions or standard procedures. In some embodiments, the Library component 234 can serve a middleware. In some embodiments, the Library component 234 can identify one or more functions and procedures and/or execute one or more of the functions and procedures on behalf of the Module 236.

It can be noted that in embodiments the implement an identifier of the version of the Library component 234, the Library component 234 can use the identifier to execute the proper version of the Library component 234 and the proper version of the Library component 234 can be used to perform the operations of the Library component 234.

At operation 254, Library component 234 performs a logging operation (e.g., common logging) to log at least one or more of the operations performed by Library component 234, requests received by Library component 234, or requests sent by Library component 234. In some embodiments, one or more of the entries (or the log itself) of the common log is cryptographically signed. In some embodiments, the logging operation can be part of secure logging to build an audit trail within the HSM 111.

At operation 256, Library component 234 sends a request to Module 236 to generate the secure data asset. In some embodiments, the request is to invoke the Module 236. In some embodiments, the request identifies and/or includes one or more of the Context (e.g., decrypted Context data or encrypted Context data if Library component 234 does not perform operation 252), arguments B, or PCD records. In some embodiments, the request is made using an RPC.

At operation 258, Module 236 identifies the PCD key and decrypts the PCD records.

At operation 260, Module 236 generates the Module response that includes the secure data asset(s). In generating the secure data asset, Module 236 uses one or more of the decrypted PCD records, decrypted Context and arguments B. As noted herein, the generation of the secure data asset is secured within HSM 111. In some embodiments, the secure data asset is encrypted by the Module 236. As noted herein, the secure data asset can include one or more of encrypted data, authenticated data, or certificates. Examples of the secure data asset can include, but is not limited to one or more of a signed certificate, cryptographic keys, random number generated values (or related values), or unique device identifiers.

At operation 262, Module 236 performs a logging operation that generates one or more transaction log entries In some embodiments, the transaction log entries can include information related to the request received from Library component 234, the response sent by Module 236 (e.g., operation 264), or the generation of the Module response (e.g. information related to the secure data asset (e.g., certificate) that was generated).

At operation 264, Module 236 sends a response (e.g., Module response) to Library component 234. The response can include the Module response that can include the secure data asset (e.g., encrypted secure data asset). In some embodiments, the response is sent using an RPC. In some embodiments, the response can include one or more of the transaction log entries.

At operation 266, Library component 234 prepares the transaction log entry(ies) received from Module 236. The transaction log entries can be modified by the Library component 234.

At operation 268, Library component 234 signs the transactional entry with a cryptographic key.

At operation 270, Library component 234 sends the Module response including the secure data asset to Application 232. In some embodiments, the Module response can include the one or more transaction entries, such as an encrypted transactional entry.

At operation 272, Application 232 stores the one or more transaction entries into a log, such as the common log. In some embodiments, the transactional entry can be stored in a log other than the common log, such as a transaction log.

At operation 274, Application 232 performs one or more post-Module operations. In some embodiments, a post-Module operation can be performed after Module 236 returns Module response.

In some embodiments, a post-Module operation can be similar to a pre-Module operation. In some embodiments, a post-Module operation can include the retrieval or generation of additional information related to the request to generate a secure data asset (e.g., from the Tester device 112 or even the request to the Library component 234 or Module 236). In some, embodiments, a post-Module operation can include a call on the network (e.g., public or private) to retrieve some information or request a service, for example, In another example, the post-Module operation can include some operation that generates or retrieves some information based on the Module response. For instance, the Application 232 can use some or all of the Module response to perform a calculation or reformat the Module response prior to sending the Module response to the Tester device 112. It can be noted that the post-Module operation can be implemented to provide flexibility in the provisioning of secure data assets to target devices, such that the data/computation/operations pipeline between Tester device 112 and Module 236 can be customized for each Use case and/or Application 232 and to take advantage of the computer resource available to the Application 232 in a secure manner.

At operation 276, Application 232 can send a Use case response that is responsive to the request to generate a secure data asset by Tester device 112 at operation 242. In some embodiments, the Use case response identifies and/or includes the requested secure data asset. In some embodiments, Application 232 passes the Module response received from Library component 234 and without modification as the Use case response. In some embodiments, Application 232 modifies and/or appends the received Module response and sends the modified and/or appended response as the Use case response. In some embodiments, the response between the Application 232 and the Tester device 112 is made using an HTTP type response.

In some embodiments, Tester device 112 uses the Use case response and the secure data asset identified therein to provision the secure data asset to a CM Core of the target device.

Although a single request from Application 232 to Platform B 240 is illustrated (e.g., operation 250), it can be appreciated that Application 232 can make one or more requests to Platform B 240. In some embodiments, Application 232 can request to invoke a different Use case and one or more of operations 250 through 272 can be repeated for the different Use case.

Figure 3A:
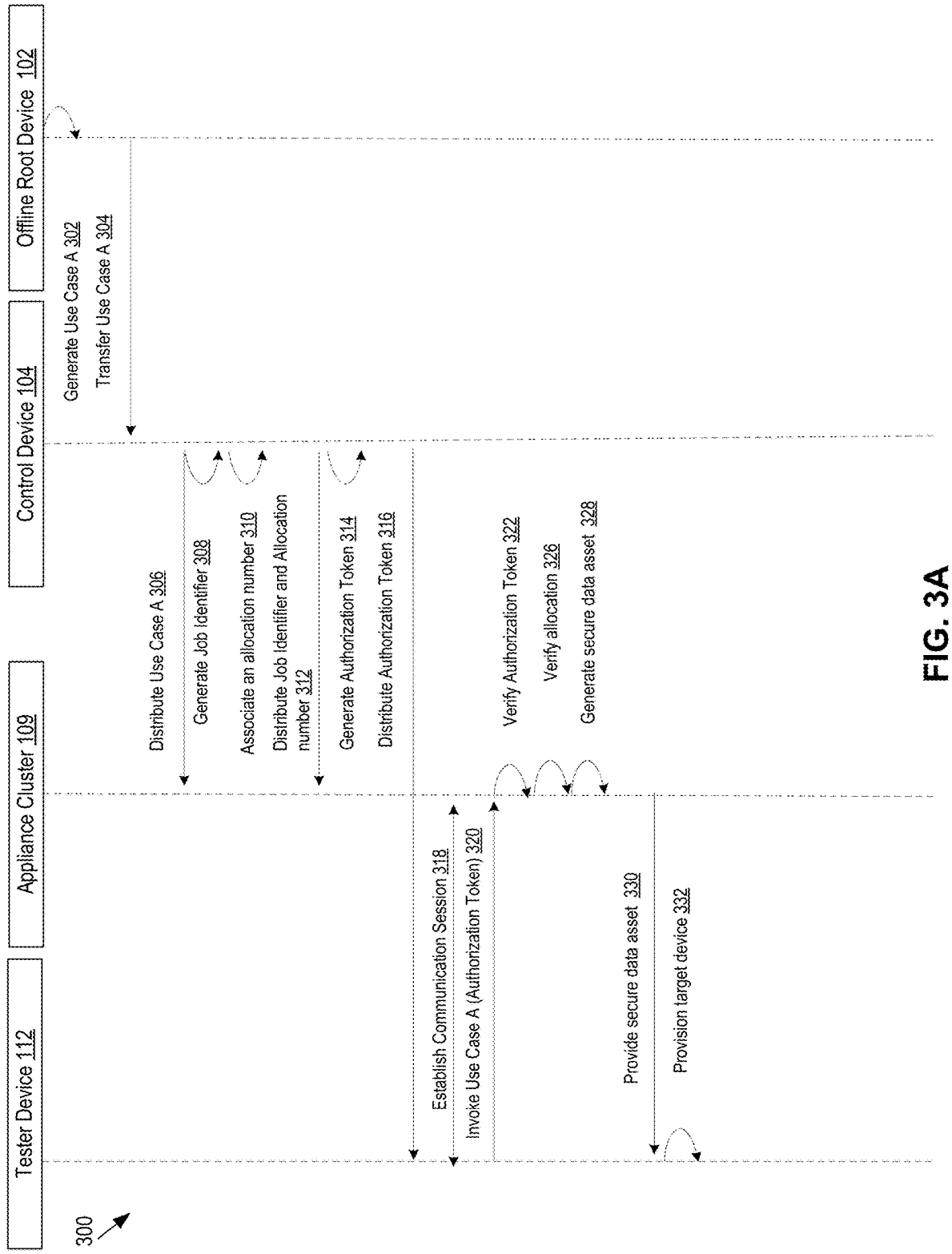
FIG. 3A is a sequence diagram illustrating the provisioning, at a CM system, of a secure data asset to a target device using an authorization token, in accordance with some embodiments of the disclosure.

FIG. 3A is a sequence diagram illustrating the provisioning of a secure data asset to a target device using an authorization token at a CM system, in accordance with some embodiments of the disclosure. Diagram 300 may include similar elements as illustrated in CM system 100 as described with respect to FIG. 1. It may be noted that elements of FIG. 1 may be used herein to help describe FIG. 3A. The operations described with respect to FIG. 3A are shown to be performed serially for the sake of illustration, rather than limitation. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. In some embodiments, Tester device 112 can implement instructions 340A to perform the operations described with respect to Tester device 112. In some embodiments, Appliance cluster 109 can implement instructions 340B to perform the instructions 340B to perform the operations described with respect to Appliance cluster 109. In some embodiments, Control device 104 can implement instructions 340C to perform operations described with respect to Control device 104. In some embodiments, Offline Root device 102 can implement instructions 340D to perform operations described with respect to Root device 102. Instructions 340A, 340B, 340C and 340D are generally referred to instructions 340 herein.

Figure 3B:
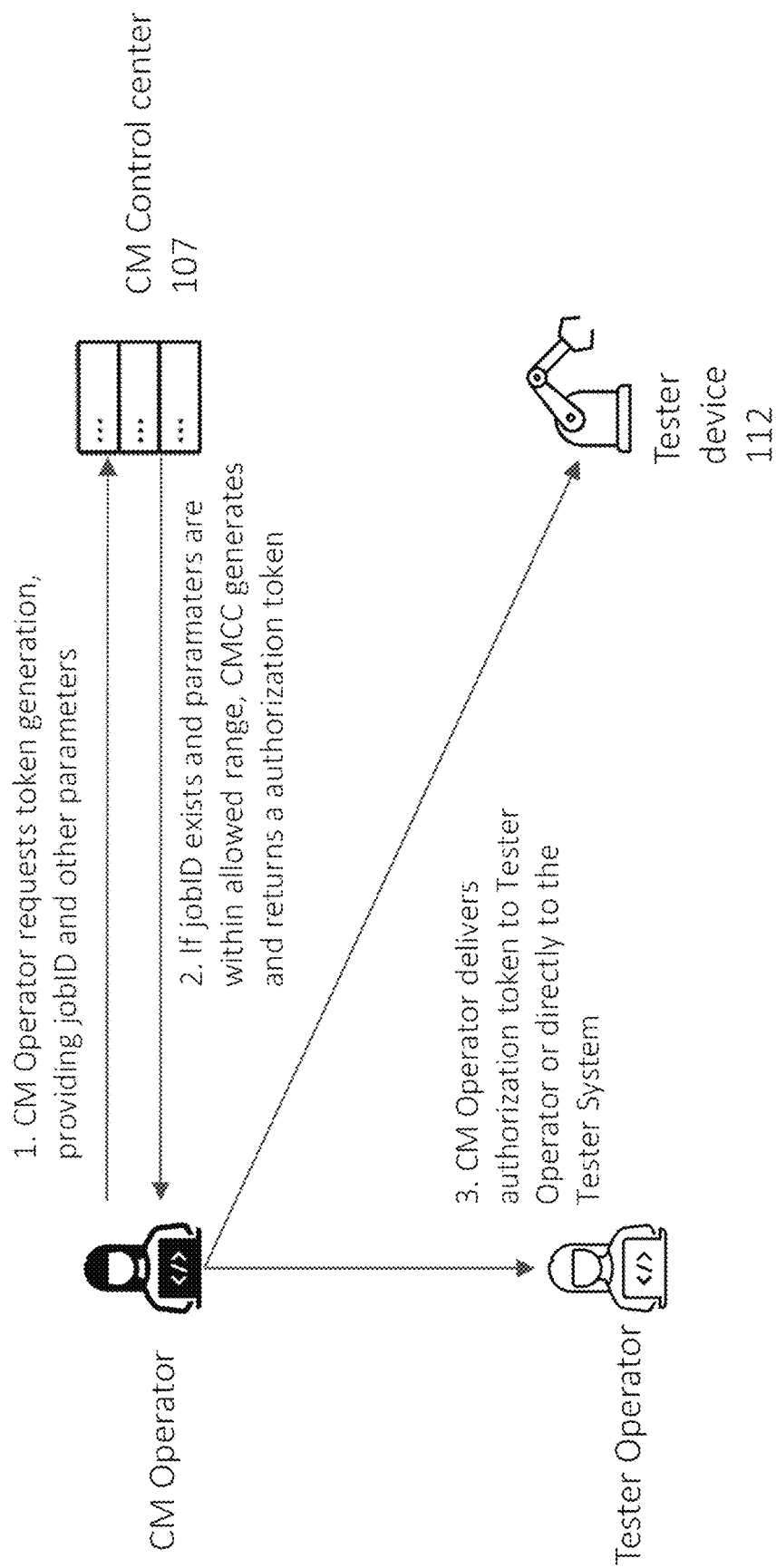
FIG. 3B illustrates authorization token generation and distribution operations, in accordance with some embodiments of the disclosure.
Figure 3C:
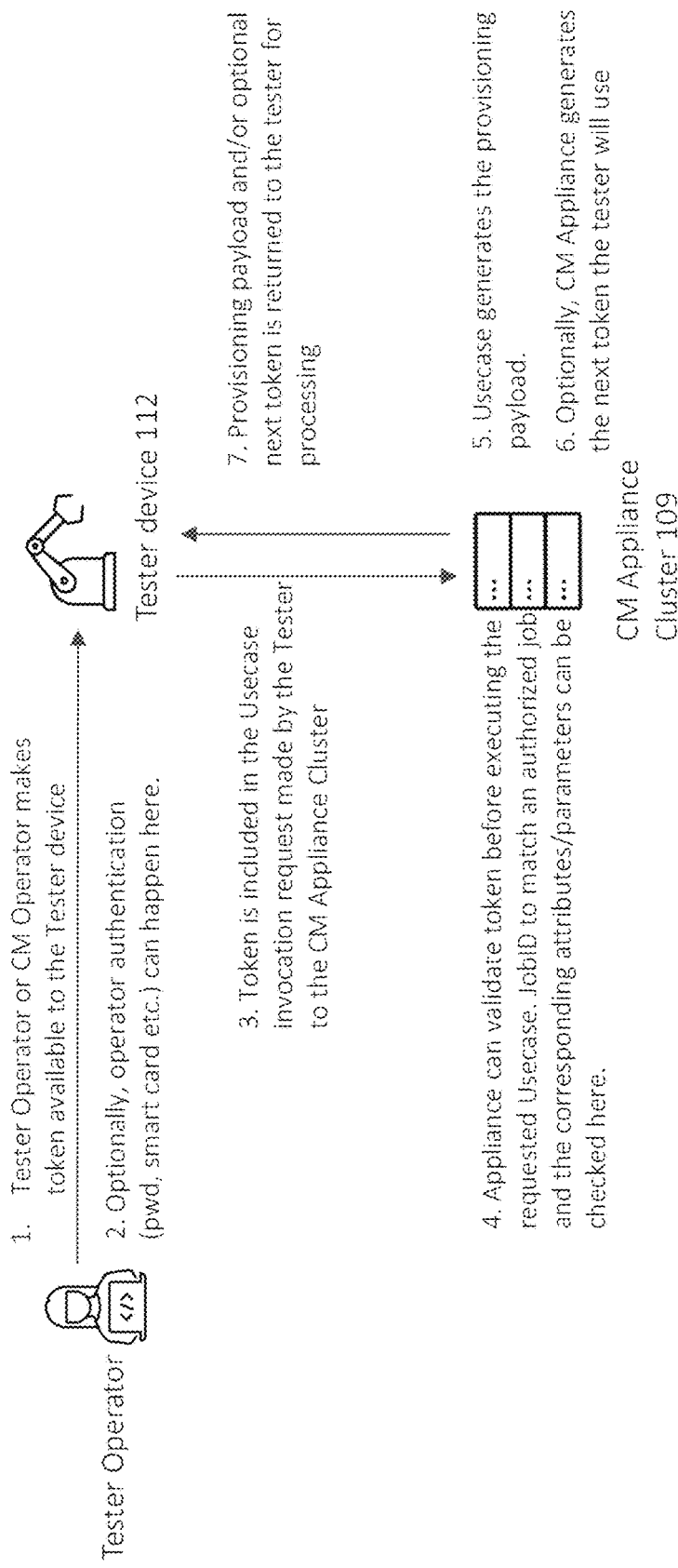
FIG. 3C illustrates authorization token use operations, in accordance with some embodiments of the disclosure.

FIG. 3B illustrates authorization token generation and distribution operations, in accordance with some embodiments of the disclosure. FIG. 3C illustrates authorization token use operations, in accordance with some embodiments of the disclosure. FIG. 3B and FIG. 3C are used to help describe some operations of diagram 300 of FIG. 3A, in accordance with some embodiments.

Returning to FIG. 3A, diagram 300 illustrates Tester device 112, Appliance cluster 109, Control device 104 and Offline Root Device 102. For the sake of clarity and brevity, Application cluster 109 is described as performing the operations as described. In some embodiments, Application cluster 109 can include one or more of Application 232, Library 234, or Module 236, each of which can perform one or more operations thereof in accordance with FIG. 2C. In some embodiments, one or more of the components including Application 232, Library 234, or Module 236 and the operations thereof can be performed at different physical devices, as described with respect to FIG. 2C. In some embodiments, Appliance cluster 109 can be implemented differently such that the one or more of the Application 232, Library 234, or Module 236 are not implemented. Although Application cluster 109 is generally described for the sake of brevity and clarity with respect to FIG. 3A, operations described with respect to FIG. 3A can be applied to any of the embodiments described directly above.

At operation 302, Root device 102 generates a Use Case, such as Use Case A. Use Case generation is described above at least with respect to FIG. 2A. It can be noted that a Use Case can be used to securely provision one or more secure data assets and can be used to generate a secure data asset at the Appliance cluster 109, in some embodiments. In some embodiments, the generation of the Use Case can include specifying whether an authorization token is required for the execution of the particular Use Case. For example, at the time of Use Case creation, the particular Use Case can be defined as requiring or not requiring an authorization token. If an authorization token is specified for a particular Use Case, the requirement that the Use Case use an authorization token for execution of the Use Case can be cryptographically bound to the Use Case.

In some embodiments, the requirement of an authorization token for execution of a Use Case can be specified for any execution of the Use Case (E.g., global), such that any Appliance cluster that executes the particular Use Case requires an authorization token (as described further below). In some embodiments, the authorization token requirement can be controlled at a granular level. For example, the Use Case can specify one or more particular Appliance clusters, among a set of Appliance clusters, require an authorization token while other Appliance clusters among the set of Appliance clusters do not require an authorization token to generate a secure data asset.

In some embodiments, the Root device 102 can specify that an authorization token can be used with a particular Use Case. Rather than require that authorization token be used with a Use case, the Root device 102 can specify that an authorization token is permitted to be used with the Use Case. Another device of the CM system can determine whether the authorization token is required for the particular Use Case. For example, the Control device 104 can determine whether the authorization token is required for a particular Use Case (e.g., subsequent to the permission specified during the creation of the Use Case).

In still other embodiments, the permission and/or requirement that an authorization token is to be used with a Use Case is not specified at the generation of the Use Case. Rather, in accordance with some embodiments, the permission and/or requirement that the authorization token is to be used with a Use Case can be specified elsewhere in the CM system, for example, by the Control device 104.

At operation 304, the Use Case, such as Use Case A is transferred to the control device. As noted above, Root device 102 can be an air-gapped device (e.g., without network connections) and the Use Case can be transferred to Control device 104, securely, using a USB or other secure device.

At operation 306, Control device 104 distributes the Use Case, such as Use Case A, to the Appliance cluster 109. For example, the Use Case (e.g., the elements thereof) can be sent via the network to Appliance cluster 109.

At operation 308, Control device 104 can generate a job identifier associated with a job. The job identifier can identify a specific job. An example of a job identifier can include a unique code or sequence of characters and/or symbols.

At operation 310, an allocation number can be created and associated with the particular job and/or job identifier and/or the particular Use Case. For example, an allocation number can indicate a number of secure data assets that are permitted to be generated for a particular job (e.g., or permitted using the corresponding) Use Case (e.g., Use Case A). For example, for a particular job, 10,000 secure data assets are allocated such that 10,000 secure data asset are permitted to generated using the corresponding job identifier (or using an associated Use Case).

At operation 312, Control device 104 distributes the job identifier and the allocation number associated with the job identifier to Appliance cluster 109. The Appliance cluster 109 can store one or more of the job identifier and the allocation number in the corresponding HSM 111 of the Appliance cluster 109.

At operation 314, Control Device 104 generates an authorization token. The authorization token can be associated with a particular job and/or identify the corresponding job identifier, such as the job identifier generated at operation 308. In some embodiments, the authorization token can be unencrypted. In other embodiments, the authorization token can be encrypted.

In some embodiments, the authorization token can include one or more parameters. In some embodiments, the one or more parameters can "bind" the authorization token to one or more particular elements or one or more conditions, such that the authorization token can be validated (e.g., verified) if (e.g., only if) the parameters are verified.

In some embodiments, the authorization token can include authorization token data that identifies the one or more parameters.

In some embodiments, the one or more parameter can include a job identifier. As noted above, the particular authorization token can be for a particular job, and as such can be bound to the job using the job identifier.

In some embodiments, the one or more parameter can be include an identifier of one or more Tester devices, such as Tester device 112. For example, the authorization token can be bound to a particular Tester device such that only the particular tester device identified by the tester device identifier is permitted to make a valid request for the generation of secure data assets.

In some embodiments, the one or more parameters can include an identifier of one or more Appliance clusters, such as Appliance cluster 109. For example, the authorization token can be bound to a particular Appliance cluster such that only the particular Appliance cluster identified by the appliance cluster identifier of the authorization token is permitted to generate the secure data asset.

In some embodiments, the one or more parameters can include an identifier of a time period. For example, authorization token can be bound to a time period such that request to generate a secure data asset or the generation of the secure data asset is permitted only within the time period identified by the time period identifier of the authorization token. For example, the time period can indicate the time of day the generation of the secure data asset is permitted (e.g., during a particular work shift). In another example, the time period can include a start date/time and end date/time, no start date/time but an end date/time, a start date/time and no end date/time, days of the week, or any other time-bounded permutation.

In some embodiments, the one or more parameters can include an identifier of an operator (e.g., user), such as the operator of the Tester device 112. For example, the authorization token can be bound to a particular operator such that only a particular operator of a Tester device that is identified by the operator identifier of the authorization token is permitted to make a valid request for the generation of the secure data asset.

In some embodiments, the one or more parameters can include an identifier of an allocation number. For example, the authorization token can be bound to an allocation number such that only a prescribed number of secure data assets specified by the allocation number are permitted to be generated for the associated job. In some embodiments, the allocation number is not a parameter contained in the authorization token. For instance, the allocation number can be sent to the Appliance cluster 109 in addition to or in lieu of including the allocation number identifier in the authorization token. In some embodiments, as described with respect to operation 326 of FIG. 3A, the allocation of secure data asset can be verified by the Appliance cluster 109 in instances where the allocation number is or is not included in the parameters of the authorization token.

In some embodiments, the one or more parameters can include a subset allocation identifier that identifies a subset of the number of secure data assets that are allocated to the job. In an example, the particular job can have an allocation of 500,000 secure data assets. The allocation of 500,000 secure data assets can be divided into sub-allocations that are subset of the 500,000 total allocations. The subset allocation identifier can identify the number of secure data assets in the sub-allocation, for example 20,000 secure data assets. The particular authorization token can be bound to the sub-allocation, such that the authorization token can only be used to generate the sub-allocation, in some embodiments. Once the sub-allocation of secure data assets has been generated using the authorization token, a new authorization token can issued that is similarly bound to another sub-allocation, such as another 20,000 of the 500,000 total secure data assets. In some embodiments, the subset allocation identifier (e.g., sub-allocation number) is not a parameter contained in the authorization token. For instance, the sub-allocation number can be sent to the Appliance cluster 109 in addition to or in lieu of including the subset allocation identifier in the authorization token. In some embodiments, as described with respect to operation 326 of FIG. 3A, the sub-allocation of secure data asset can be verified by the Appliance cluster 109 in instances where the subset allocation identifier is or is not included in the parameters of the authorization token.

In some embodiments and illustrated in FIG. 3B, an operator (e.g., CM operator) of the Control center 107 (e.g. Control device 104 of the Control center 107) can send a request to the Control center 107, via a client device, to generate an authorization token. In some embodiments, the request from the operator can include one or more parameters as described herein, such as a job identifier (e.g., JobID). In some embodiments, the Control center 107 verifies whether the job identifier of the request exists (e.g., compares the job identifier of the request to a record of valid job identifiers). In some embodiments, the Control center verifies whether the one or more parameters are within an allowed range (e.g., verifies whether the parameters are valid in accordance with a parameter policy). In some embodiments, if one or more of the job identifier or one or more additional parameters are verified, the Control center 107 generates the authorization token. In some embodiments, the authorization token is returned to the operator of the Control center 107 in response to the request to generate the authorization token. In some embodiments, as illustrated in FIG. 3C, the operator of the Tester device 112 sends the authorization token to the Tester device 112.

Returning to FIG. 3A, at operation 316, Control device 104 distributes the authorization token to the Tester device 112. In some embodiments and as illustrated in FIG. 3B, the operator of Control center 107 can send the authorization token to the tester operator or directly to the Tester device 112. In some embodiments, the Control device 104 can distribute the authorization token to the Appliance cluster 109 from which the authorization token is subsequently distributed to the Tester device 112, directly or indirectly (e.g., via the operator of Tester device 112).

Returning to FIG. 3A, at operation 318 a communication session between the Tester device 112 and the Appliance cluster 109 is established. In some embodiments, Appliance cluster 109 initiates the communication session. In other embodiments, the Tester device 112 initiates the communication session. In some embodiments, the communication session can be conducted using a cryptographic protocol, such as a transport layer security (TLS) protocol that provides end-to-end encryption. In some embodiments, the communication session can implement mutual TLS where both parties (e.g., the Appliance cluster 109 and the Tester device 112) are authenticated. For instance, each of the Appliance cluster 109 and the Tester device 112 can be authenticated (e.g., by the other of the Appliance cluster 109 or Tester device 112) by verifying whether each has the correct or valid private key.

At operation 320, Tester device 112 sends a request to Appliance cluster 109 to generate a secure data asset to be securely provisioned to a target device. In some embodiments, the request includes or authorization token. In some embodiments, the request to generate a secure data asset can include a request to invoke a Use case (e.g., Use case A), as illustrated with respect to FIG. 3C. In some embodiments, the authorization token is included with the Use case invocation request. In some embodiments, an authorization token can be stored on a removable storage device, such as a USB drive, held by an operator of the Tester device 112 and copied from there into the Appliance request at the time of execution. In some embodiments, the authorization token can be stored as a server, such as a Control device 104 that is accessible by the Tester device 112 and the Tester device 112 accesses the authorization token at the time of execution. In some embodiments, the Tester device 112 may retrieve the authorization token from a server before execution (e.g., at the start of the shift the operator of the Tester device 112). In some embodiments, a server (e.g., Control device 104) can be the original source of the authorization token and can create the authorization token based on the request and/or a set of rules.

Returning to FIG. 3A, at operation 322 the Appliance cluster 109 performs one or more verification operations to verify (e.g., validate) the authorization token. In some embodiments, the one or more verification operations verify the allocation. In other embodiments, verifying the authorization token and verifying the allocation can include separate processes/operations, as illustrated by operation 322 and 324. In some embodiments, the one or more verification operations can verify whether the Tester device 112 is authorized to request the generation of the secure data asset. In some embodiments, verifying one or more of the authorization token or the allocation can verify that the Tester device 112 is authorized to request the generation of the secure data asset. It can be noted that at least one verification or any combination of verification operations can be implemented in some embodiments.

In some embodiments, the one or more verification operations include determining whether the job identifier of the authorization token corresponds to an authorized job. For example, the job identifier of the authorization token can be compared to the job identifier received at operation 312. If the job identifier is similar (e.g., matches) the job identifier received at operation 312, the job identifier of the authorization token is verified, else the job identifier of the authorization token is not verified. If the job identifier is verified, the Appliance cluster 109 can proceed to another verification operation, and if no other verification operations are identified the Appliance cluster 109 can verify the authorization token. If the job identifier is not verified, the request to generate the secure data asset can be denied.

In some embodiments, the one or more verification operations can include verifying a digital signature associated with the authorization token based on a cryptographic key. For example, the authorization token can include a cryptographic signature (e.g., digital signature). The cryptographic signature can be decrypted using a public cryptographic key, such as the public cryptographic key included in the authorization token or otherwise obtained. The decrypted cryptographic signature can represent a value, such as a first hash value. The data of the authorization token, such as the job identifier and/or other parameters can be used as input into a hash function to generate a second hash value. The first and second hash value can be compared. If the first and second hash values are similar (e.g., identical) the cryptographic signature is verified. If the first and second hash values are not similar (e.g., not identical) the cryptographic signature is not verified. If the digital signature is verified, the Appliance cluster 109 can proceed to another verification operation, and if no other verification operations are identified the Appliance cluster 109 can verify the authorization token. If the digital signature is not verified, the request to generate the secure data asset can be denied.

Further reference to verifying the authorization token can be found with respect to FIG. 3C at operation 4.

Returning to FIG. 3A, Appliance cluster 109 can further perform one or more verification operations. In some embodiments, a verification operation can include verifying one or more parameters that "bind" the authorization token to one or more particular elements or one or more conditions. As noted above, the one or more parameters can be included in or with the authorization token. It can be noted that any of the parameters described herein may not be included in or with the authorization token, and if not included the verification operation pertaining to the particular additional parameter may not performed.

As noted above, the one or more parameters of the authorization token can include an identifier of one or more Tester devices, such as Tester device 112. The authorization token can be bound to a particular Tester device such that only the particular tester identified by the tester device identifier is permitted to make a valid request for the generation of secure data assets.

In some embodiments, the one or more verification operations can include the Appliance cluster 109 verifying whether the Tester device 112 making the request to generate a secure data asset is the same Tester device 112 identified by the tester device identifier of the authorization token. In some embodiments, the Appliance cluster 109 can authenticate the Tester device 112 and determine if the authenticated Tester device 112 is the Tester device 112 that is bound to the authorization token. In some embodiments, the Tester device 112 is authenticated at operation 318 when establishing a communication session. In such embodiments, the Appliance cluster 109 may not re-authenticate the Tester device 112 and can determine whether the Tester device 112 is a Tester device 112 that is bound to the authorization token via the tester device identifier. If the Tester device 112 is verified, the Appliance cluster 109 can proceed to another verification operation, and if no other verification operations are identified the Appliance cluster 109 can verify the authorization token. If the Tester device 112 is not verified, the request to generate the secure data asset can be denied.

As noted above, the one or more parameters of the authorization token can include an identifier of one or more Appliance clusters, such as Appliance cluster 109. The authorization token can be bound to a particular Appliance cluster such that only the particular Appliance cluster identified by the appliance cluster identifier of the authorization token is permitted to generate the secure data asset.

In some embodiments, the one or more verification operations can include the Appliance cluster 109 verifying whether Appliance cluster 109 (Appliance cluster 109 itself) that received the request to generate a secure data asset is the same Appliance cluster identified by the appliance cluster identifier. If the appliance cluster identifier of the authorization token does identify the Appliance cluster 109, the Appliance cluster 109 is verified. If the appliance cluster identifier of the authorization token does not identify the Appliance cluster 109, the Appliance cluster 109 is not verified. If the Appliance cluster 109 is verified, the Appliance cluster 109 can proceed to another verification operation, and if no other verification operations are identified the Appliance cluster 109 can verify the authorization token. If the Appliance cluster 109 is not verified, the request to generate the secure data asset can be denied.

As noted above, the one or more parameters of the authorization token can include an identifier of a time period. For example, the authorization token can be bound to a time period such that request to generate secure data asset or the generation of the secure data asset is permitted only within the time period identified by the time period identifier of the authorization token.

In some embodiments, the one or more verification operations can include the Appliance cluster 109 determining whether the time condition is satisfied. For example, to determine whether the time condition is satisfied, the Appliance cluster 109 can determine whether the request to generate a secure data asset is made within a time period specified by the time period identifier. If the time condition is satisfied, the Appliance cluster 109 can proceed to another verification operation, and if no other verification operations are identified the Appliance cluster 109 can verify the authorization token. If the time condition is not satisfied, the request to generate the secure data asset can be denied.

As noted above, the one or more parameters of the authorization token can include an identifier of an operator (e.g., user), such as the operator of the Tester device 112. For example, the authorization token can be bound to a particular operator such that only a particular operator identified by the operator identifier of the authorization token is permitted to make a valid request for the generation of the secure data asset.

In some embodiments, the one or more verification operations can include the Appliance cluster 109 determining whether the operator of the Tester device 112 is authorized to make a valid request to generate secure data asset(s). As illustrated in FIG. 3C, the operator of Tester device 112 can provide user credentials, such as username and password, a smart card or other credential(s), to Appliance cluster 109. The Appliance cluster 109 can perform an authentication of the operator based on the user credentials. Subsequent to authentication, the Appliance cluster 109 can verify whether the authenticated operator is authorization to make the request based on the operator identifier. For example, the Appliance cluster 109 can determine whether the authenticated operator is the same operator identified by the operator identifier of the authorization token. If operator is verified, the Appliance cluster 109 can proceed to another verification operation, and if no other verification operations are identified the Appliance cluster 109 can verify the authorization token. If the operator is not verified, the request to generate the secure data asset can be denied.

Returning to FIG. 3A, at operation 326, Appliance cluster 109 can verify that allocation of secure data assets for a job. In some embodiments, the Appliance cluster 109 may have a record of the allocation number. For instance, as described with respect to operation 312, information indicating the allocation number can be sent from Control device 104 to Appliance cluster 109. The allocation number can be associated with the corresponding job identifier at the Appliance cluster 109.

In some embodiments, to verify the allocation, Appliance cluster 109 can identify the number of secure data assets that are allocated to a job that corresponds to the job identifier of the authorization token. For example, the Appliance cluster 109 can identify from a record the allocation number associated with a particular job identifier of the authorization token. In some embodiments, the Appliance cluster 109 can determine whether the secure data asset corresponding to the request satisfies a condition related to the number of secure data assets that are allocated to the job. For instance, using the record Appliance cluster 109 can determine the number of secure data asset allocated to the job (e.g., allocation number) based on the job identifier (e.g., 1,000 secure data assets) and determine the number of secure data assets that have previously been generated for the job (e.g., 900 secure data asset previously generated for the current job). If any secure data assets remain in the allocation (e.g., 100 secure data assets remain unallocated), the condition is satisfied and the allocation is verified. If no secure data assets remain in the allocation (e.g., all 1,000 secure data assets have previously been allocated/generated), the condition is not satisfied and the allocation is not verified. In some embodiments, if condition related to the allocation number is satisfied, the Appliance cluster 109 can verify the allocation. If the condition related to the allocation number is not satisfied, the request to generate the secure data asset can be denied.

As noted above, the one or more parameters can include a subset allocation identifier that identifies a subset of the number of secure data assets that are allocated to the job. For instance, the particular job can have an allocation of 500,000 secure data assets. The allocation of 500,000 secure data assets can be divided into sub-allocations that are subset of the 500,000 total secure data assets. The subset allocation identifier can identify the number of secure data assets in the sub-allocation, for example 20,000 iterations. In some embodiments, the subset allocation identifier may not be a parameter of the authorization token. The Appliance cluster 109 may have a record of the subset allocation identifier. For instance, information pertaining to the subset allocation identifier can be sent to from Control device 104 to Appliance cluster 109 in a similar manner as described with respect to operation 312. The information pertaining to the subset allocation identifier can be associated with the corresponding job identifier at the Appliance cluster 109.

In some embodiments, to verify the allocation of a subset of secure data assets (e.g., sub-allocation), Appliance cluster 109 can identify the subset of the number of secure data assets that are allocated to a job (e.g., sub-allocation of 20,000 of a total allocation of 500,000 secure data assets) that corresponds to the job identifier of the authorization token. For example, the Appliance cluster 109 can identify, from a record or authorization token, the sub-allocation number associated with a particular job identifier. In some embodiments, the Appliance cluster 109 can determine whether the secure data asset corresponding to the request satisfies a condition related to the subset of the number of secure data assets that are allocated to the job. For instance, using the record and/or authorization token, Appliance cluster 109 can determine the subset of the number of secure data asset allocated to the job (e.g., sub-allocation number such as 20,000) and determine the number of secure data assets of the sub-allocation that have previously been generated for the job (e.g., 19,000 secure data assets were previously generated for the current job). If any secure data assets remain in the sub-allocation (e.g., 1,000 secure data assets remain unallocated), the Appliance cluster 109 verifies the sub-allocation. If no secure data assets remain in the sub-allocation (e.g., all 20,000 of the secure data assets of the sub-allocation have been generated) and no secure data assets remain in the total allocation (e.g., all 500,000 of the secure data assets of the allocation have been generated), the request to generate the secure data asset can be denied. If no secure data assets remain in the sub-allocation but secure data assets remain in the total allocation (e.g., 100,000 of the 500,000 secure data assets of the total allocation have been generated and 400,000 remain), the Appliance cluster 109 can generate a new authorization token (similar to the authorization token described herein) that includes a new subset allocation identifier that allocates another sub-set of the total allocation of secure data assets for provisioning (e.g., a new 20,000 sub-allocation of the 500,000 allocated secure data assets) (see also operation 6 of FIG. 3C). In some instances, after generating a secure data asset, the Appliance cluster can determine whether any additional secure data assets remain in the sub-allocation. If no secure data assets remain in the sub-allocation but secure data assets remain in the total allocation, Application cluster can generate a new authorization token the include a new subset allocation identifier. The new authorization token is sent to the Tester device 112 by the Appliance cluster 109. The above can be repeated for a new request to generate a secure data asset based on the new authorization token.

At operation 328, if one or more of the authorization token or allocation are verified, Appliance cluster 109 can generate the secure data asset. For example, as illustrated in operation 5 of FIG. 3C, Appliance 108 can generate the provisioning payload (e.g., secure data asset) based on the Use case.

Returning to FIG. 3A, at operation 330 the secure data asset is provided to Tester device 112 in response to the request (see also operation 7 of FIG. 3C). In some embodiments, Appliance cluster 109 can send a Use case response that is responsive to the request to generate a secure data asset by Tester device 112. In some embodiments, the Use case response identifies and/or includes the requested secure data asset.

At operation 332, Tester device 112 uses the secure data asset to provision the secure data asset to a CM Core of the target device.

Method 400 and/or each of the aforementioned method's individual functions, routines, subroutines, or operations can be performed by a processing device, having one or more processing units (CPU) and memory devices communicatively coupled to the CPU(s). In some embodiments, the aforementioned method can be performed by a single processing thread or alternatively by two or more processing threads, each thread executing one or more individual functions, routines, subroutines, or operations of the method. The aforementioned method as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 400 is performed by Appliance cluster 109 as described in FIG. 1 and FIG. 2A-3C. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1 and FIG. 3A-3C may be used herein to help describe FIG. 4.

Figure 4:
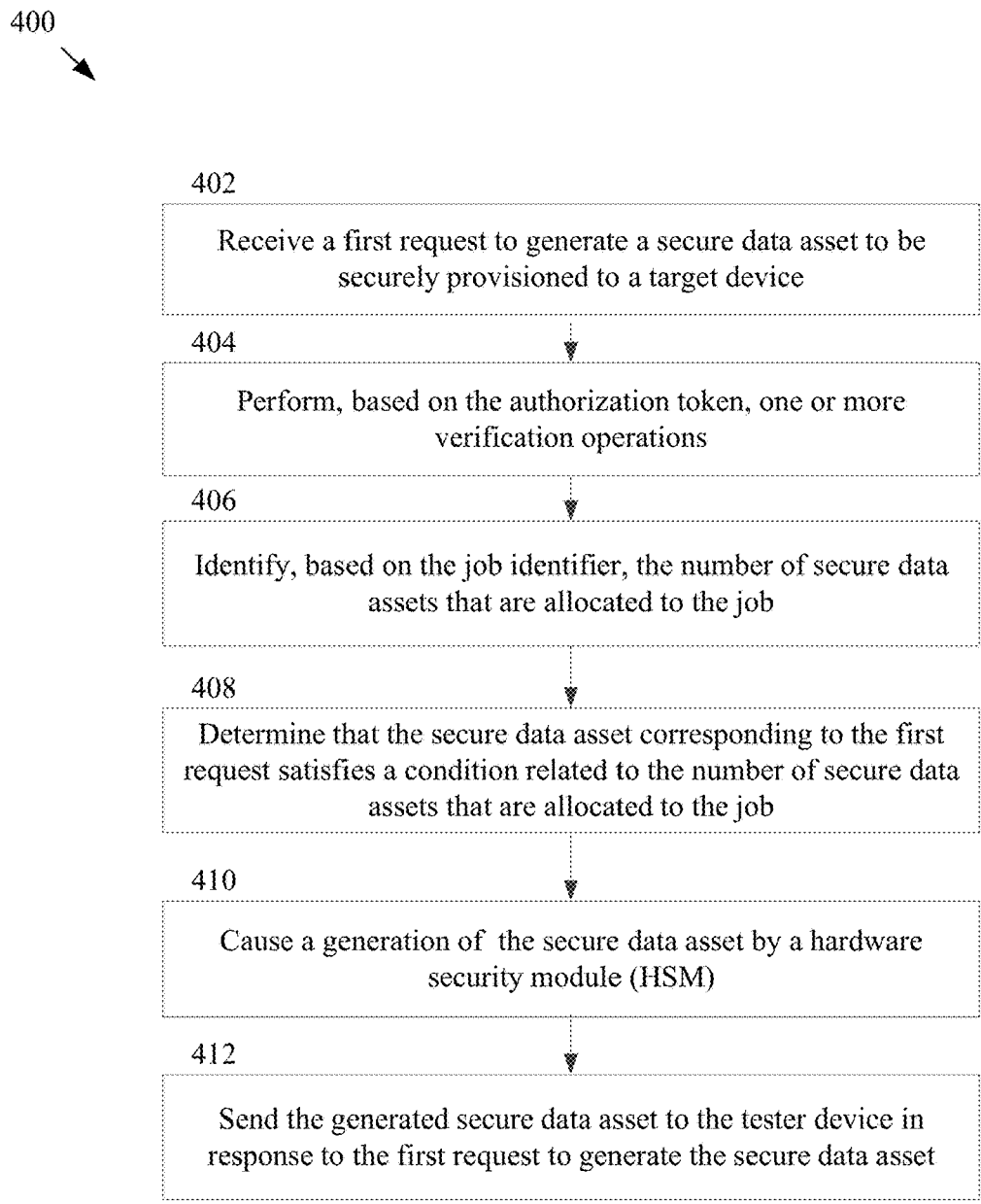
FIG. 4 depicts a flow diagram of an example method of using an authorization token in the generation of a secure data asset for provisioning to a target device, in accordance with some embodiments of the disclosure.

FIG. 4 depicts a flow diagram of an example method 400 of using an authorization token in the generation of a secure data asset for provisioning to a target device, in accordance with some embodiments of the disclosure.

At operation 402 of method 400, processing logic receives a request to generate a secure data asset to be securely provisioned to a target device. In some embodiments, the request includes an authorization token. In some embodiments, the request is received by an appliance cluster and from a tester device. In some embodiments, the secure data asset includes one or more of encrypted data, authenticated data, or a certificate.

At operation 404, processing logic performs, based on the authorization token, one or more verification operations. In some embodiments, the one or more verification operations validate the authorization token. In some embodiments, the one or more verification operations are performed to determine whether the tester device is authorized to request the generation of the secure data asset. In some embodiments, the one or more verification operations are performed responsive to receiving the request.

In some embodiments, to perform the one or more verification operations to determine whether the tester device is authorized to request the generation of the secure data asset, the processing device validates a digital signature associated with the authorization token based on a cryptographic key.

In some embodiments, to perform the one or more verification operations to determine whether the tester device is authorized to request the generation of the secure data asset, the processing device determines one or more tester devices identified by the authorization token. In some embodiments, processing logic determines whether the tester device associated with the request to generate the secure date asset is among the one or more tester devices identified by the authorization token.

In some embodiments, to perform the one or more verification operations to determine whether the tester device is authorized to request the generation of the secure data asset, the processing device determines one or more appliance clusters identified by the authorization token. In some embodiments, processing logic determines whether the appliance cluster that received the request to generate the secure data asset is among the one or more appliance clusters identified by the authorization token.

In some embodiments, to perform the one or more verification operations to determine whether the tester device is authorized to request the generation of the secure data asset, the processing device determines a time period identified by the authorization token. In some embodiments, the time period indicates a period of time during which the generation of the secure data asset is permitted. In some embodiments, processing logic determines whether the request is received within the time period.

In some embodiments, to perform the one or more verification operations to determine whether the tester device is authorized to request the generation of the secure data asset, processing logic determines one or more user identifiers identified by the authorization token. In some embodiments, processing logic determines whether a user identifier associated with the tester device is among the one or more user identifiers identified by the authorization token.

At operation 406, processing logic identifies, based on the job identifier, the number of secure data assets that are allocated to the job. In some embodiments, the authorization token includes a job identifier related to a number of secure data assets that are allocated to a job.

At operation 408, processing logic determines that the secure data asset corresponding to the request satisfies a condition related to the number of secure data assets that are allocated to the job. In some embodiments, determining that the tester device is authorized to request the generation of the secure data asset is responsive to determining that the secure data asset corresponding to the request satisfies the condition.

In some embodiments, the authorization token includes a job identifier related to a number of secure data assets that are allocated to a job. In some embodiments, the authorization token is a first authorization token. In some embodiments, processing logic determines a subset of the number of secure data assets that are allocated to the job based on the first authorization token. In some embodiments, processing logic determines whether the generated secure data asset corresponding to the request satisfies a condition related to the subset of the number of secure data assets that are allocated to the job. In some embodiments, responsive to determining that the generated secure data asset satisfies the condition, processing logic generates a second authorization token that includes the job identifier. In some embodiments, processing logic provides the second authorization token to the tester device.

At operation 410, processing logic causes a generation of the secure data asset by a hardware security module (HSM). In some embodiments, causing a generation of the secure data asset by a hardware security module (HSM) is responsive to determining that the tester device is authorized to request the generation of the secure data asset.

At operation 412, processing logic sends the generated secure data asset to the tester device in response to the request to generate the secure data asset.

Figure 5:
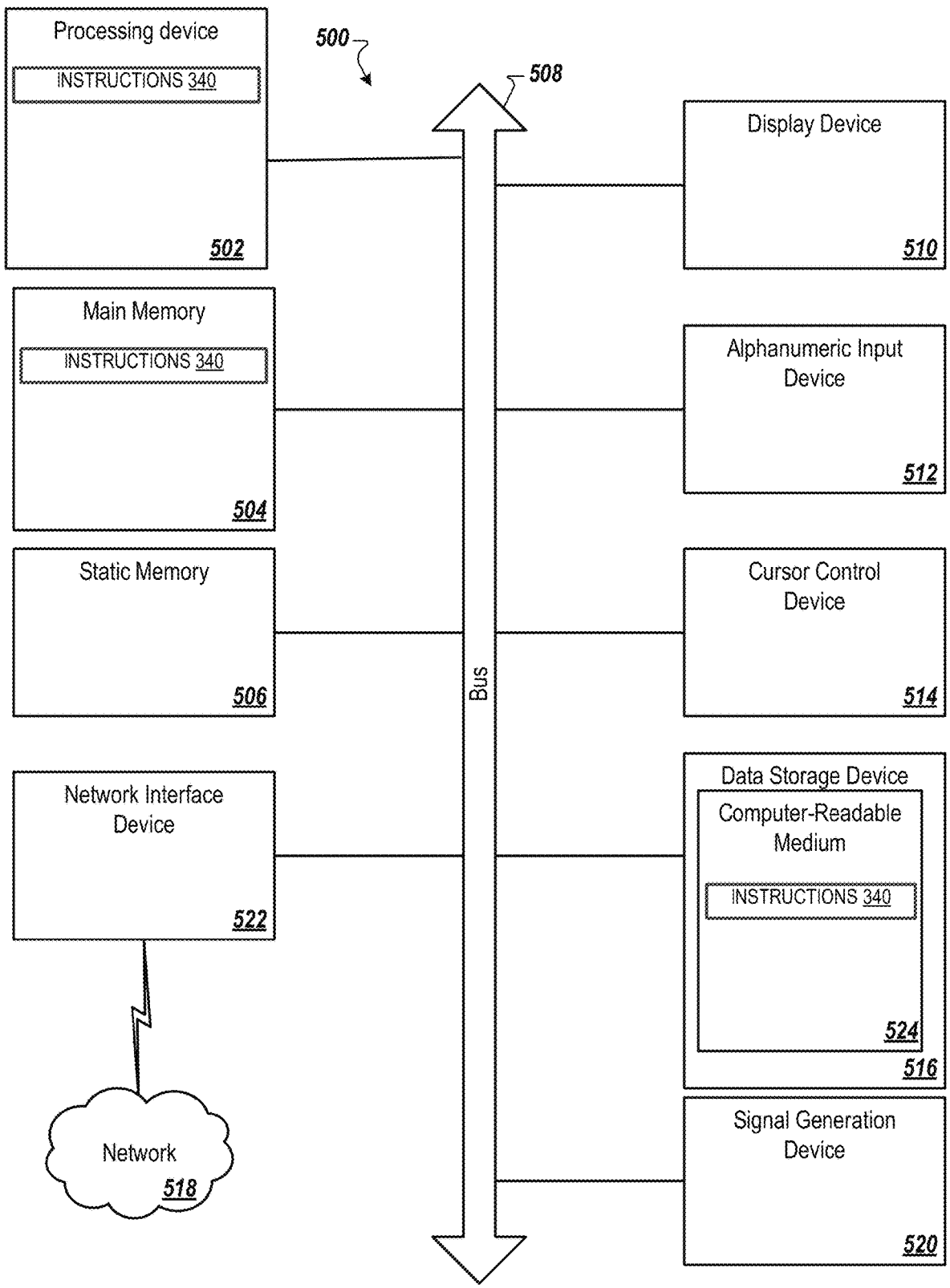
FIG. 5 is a block diagram illustrating an exemplary computer system, in accordance with some embodiments of the disclosure.

FIG. 5 is a block diagram illustrating an exemplary computer system 500, in accordance with some embodiments of the disclosure. The computer system 500 executes one or more sets of instructions that cause the machine to perform any one or more of the methodologies discussed herein. Set of instructions, instructions, and the like may refer to instructions (e.g., instructions 340) that, when executed by computer system 500, cause computer system 500 to perform one or more operations described herein. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 340 of the elements of system architecture 100 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions 340 of the elements of system architecture 100 embodying any one or more of the methodologies or functions described herein. The sets of instructions 340 of the elements of system architecture 100 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:
receiving, by an appliance cluster and from a tester device, a request to generate a secure data asset to be securely provisioned to a target device, the request comprising an authorization token;
responsive to receiving the request, performing, based on the authorization token, one or more verification operations to determine whether the tester device is authorized to request the generation of the secure data asset, wherein the authorization token comprises one or more parameters identifying the tester device;
responsive to determining that the tester device is authorized to request the generation of the secure data asset, causing a generation of the secure data asset by a hardware security module (HSM); and
sending the generated secure data asset to the tester device in response to the request to generate the secure data asset.

2. The method of claim 1, wherein the authorization token comprises a job identifier related to a number of secure data assets that are allocated to a job, the method further comprising:
identifying, based on the job identifier, the number of secure data assets that are allocated to the job; and
determining that the secure data asset corresponding to the request satisfies a condition related to the number of secure data assets that are allocated to the job, wherein determining that the tester device is authorized to request the generation of the secure data asset is responsive to determining that the secure data asset corresponding to the request satisfies the condition.

3. The method of claim 1, wherein performing the one or more verification operations to determine whether the tester device is authorized to request the generation of the secure data asset, comprises:
validating a digital signature associated with the authorization token based on a cryptographic key.

4. The method of claim 1, wherein performing the one or more verification operations to determine whether the tester device is authorized to request the generation of the secure data asset, comprises:
determining one or more tester devices identified by the authorization token; and
determining whether the tester device associated with the request to generate the secure data asset is among the one or more tester devices identified by the authorization token.

5. The method of claim 1, wherein performing the one or more verification operations to determine whether the tester device is authorized to request the generation of the secure data asset, comprises:
determining one or more appliance clusters identified by the authorization token; and
determining whether the appliance cluster that received the request to generate the secure data asset is among the one or more appliance clusters identified by the authorization token.

6. The method of claim 1, wherein performing the one or more verification operations to determine whether the tester device is authorized to request the generation of the secure data asset, comprises:
determining a time period identified by the authorization token, the time period indicating a period of time during which the generation of the secure data asset is permitted; and
determining whether the request is received within the time period.

7. The method of claim 1, wherein performing the one or more verification operations to determine whether the tester device is authorized to request the generation of the secure data asset, comprises:
determining one or more user identifiers identified by the authorization token; and
determining whether a user identifier associated with the tester device is among the one or more user identifiers identified by the authorization token.

8. The method of claim 1, wherein the authorization token comprises a job identifier related to a number of secure data assets that are allocated to a job, wherein the authorization token is a first authorization token, the method further comprising:
determining a subset of the number of secure data assets that are allocated to the job based on the first authorization token;
determining whether the generated secure data asset corresponding to the request satisfies a condition related to the subset of the number of secure data assets that are allocated to the job; and
responsive to determining that the generated secure data asset satisfies the condition, generating a second authorization token comprising the job identifier; and
providing the second authorization token to the tester device.

9. The method of claim 1, wherein the secure data asset comprises one or more of encrypted data, authenticated data, or a certificate.

10. A system comprising:
a memory; and
a processing device, coupled to the memory, to perform operations comprising:
receiving, by an appliance cluster and from a tester device, a request to generate a secure data asset to be securely provisioned to a target device, the request comprising an authorization token;
responsive to receiving the request, performing, based on the authorization token, one or more verification operations to determine whether the tester device is authorized to request the generation of the secure data asset, wherein the authorization token comprises one or more parameters identifying the tester device;
responsive to determining that the tester device is authorized to request the generation of the secure data asset, causing a generation of the secure data asset by a hardware security module (HSM); and
sending the generated secure data asset to the tester device in response to the request to generate the secure data asset.

11. The system of claim 10, wherein the authorization token comprises a job identifier related to a number of secure data assets that are allocated to a job, the operations further comprising:
identifying, based on the job identifier, the number of secure data assets that are allocated to the job; and
determining that the secure data asset corresponding to the request satisfies a condition related to the number of secure data assets that are allocated to the job, wherein determining that the tester device is authorized to request the generation of the secure data asset is responsive to determining that the secure data asset corresponding to the request satisfies the condition.

12. The system of claim 10, wherein performing the one or more verification operations to determine whether the tester device is authorized to request the generation of the secure data asset, comprises:
   validating a digital signature associated with the authorization token based on a cryptographic key.

13. The system of claim 10, wherein performing the one or more verification operations to determine whether the tester device is authorized to request the generation of the secure data asset, comprises:
   determining one or more tester devices identified by the authorization token; and
   determining whether the tester device associated with the request to generate the secure data asset is among the one or more tester devices identified by the authorization token.

14. The system of claim 10, wherein performing the one or more verification operations to determine whether the tester device is authorized to request the generation of the secure data asset, comprises:
   determining one or more appliance clusters identified by the authorization token; and
   determining whether the appliance cluster that received the request to generate the secure data asset is among the one or more appliance clusters identified by the authorization token.

15. The system of claim 10, wherein performing the one or more verification operations to determine whether the tester device is authorized to request the generation of the secure data asset, comprises:
   determining a time period identified by the authorization token, the time period indicating a period of time during which the generation of the secure data asset is permitted; and
   determining whether the request is received within the time period.

16. The system of claim 10, wherein performing the one or more verification operations to determine whether the tester device is authorized to request the generation of the secure data asset, comprises:
   determining one or more user identifiers identified by the authorization token; and
   determining whether a user identifier associated with the tester device is among the one or more user identifiers identified by the authorization token.

17. The system of claim 10, wherein the authorization token comprises a job identifier related to a number of secure data assets that are allocated to a job, wherein the authorization token is a first authorization token, the operations further comprising:
   determining a subset of the number of secure data assets that are allocated to the job based on the first authorization token;
   determining whether the generated secure data asset corresponding to the request satisfies a condition related to the subset of the number of secure data assets that are allocated to the job; and
   responsive to determining that the generated secure data asset satisfies the condition, generating a second authorization token comprising the job identifier; and
   providing the second authorization token to the tester device.

18. The system of claim 10, wherein the secure data asset comprises one or more of encrypted data, authenticated data, or a certificate.

19. A non-transitory computer-readable medium comprising instructions that, responsive to execution by a processing device, cause the processing device to perform operations comprising:
   receiving, by an appliance cluster and from a tester device, a request to generate a secure data asset to be securely provisioned to a target device, the request comprising an authorization token;
   responsive to receiving the request, performing, based on the authorization token, one or more verification operations to determine whether the tester device is authorized to request the generation of the secure data asset, wherein the authorization token comprises one or more parameters identifying the tester device;
   responsive to determining that the tester device is authorized to request the generation of the secure data asset, causing a generation of the secure data asset by a hardware security module (HSM); and
   sending the generated secure data asset to the tester device in response to the request to generate the secure data asset.

20. The non-transitory computer-readable medium of claim 19, wherein the authorization token comprises a job identifier related to a number of secure data assets that are allocated to a job, the operations further comprising:
   identifying, based on the job identifier, the number of secure data assets that are allocated to the job; and
   determining that the secure data asset corresponding to the request satisfies a condition related to the number of secure data assets that are allocated to the job, wherein determining that the tester device is authorized to request the generation of the secure data asset is responsive to determining that the secure data asset corresponding to the request satisfies the condition.

* * * * *